United States Patent
Lee et al.

(10) Patent No.: US 10,474,322 B2
(45) Date of Patent: Nov. 12, 2019

(54) IMAGE DISPLAY APPARATUS

(71) Applicant: LG ELECTRONICS INC., Seoul (KR)

(72) Inventors: Jaekyung Lee, Seoul (KR); Eunjung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 619 days.

(21) Appl. No.: 15/003,268

(22) Filed: Jan. 21, 2016

(65) Prior Publication Data
US 2016/0216852 A1    Jul. 28, 2016

(30) Foreign Application Priority Data

Jan. 26, 2015 (KR) .................. 10-2015-0012235

(51) Int. Cl.
| | | |
|---|---|---|
| *G06F 3/0482* | (2013.01) | |
| *H04N 21/41* | (2011.01) | |
| *H04N 21/472* | (2011.01) | |
| *G06F 3/0481* | (2013.01) | |
| *G06F 3/0484* | (2013.01) | |
| *G06F 3/14* | (2006.01) | |
| *H04N 21/436* | (2011.01) | |
| *H04N 21/81* | (2011.01) | |

(52) U.S. Cl.
CPC ........ *G06F 3/0482* (2013.01); *G06F 3/04817* (2013.01); *G06F 3/04842* (2013.01); *G06F 3/1454* (2013.01); *H04N 21/4122* (2013.01); *H04N 21/4126* (2013.01); *H04N 21/43615* (2013.01); *H04N 21/472* (2013.01); *H04N 21/8173* (2013.01)

(58) Field of Classification Search
CPC .. G06F 3/0482; G06F 3/04817; G06F 3/1454; H04N 21/4122; H04N 21/4126; H04N 21/43615; H04N 21/472; H04N 21/8173
See application file for complete search history.

(56) References Cited

U.S. PATENT DOCUMENTS

2011/0275391 A1\* 11/2011 Lee ..................... H04M 1/7253
                                                        455/500
2012/0088548 A1\* 4/2012 Yun ........................ G08C 17/02
                                                        455/557
(Continued)

FOREIGN PATENT DOCUMENTS

| CN | 104750237 A | 7/2015 |
|---|---|---|
| EP | 2385689 A1 | 11/2011 |

(Continued)

*Primary Examiner* — Anil K Bhargava
(74) *Attorney, Agent, or Firm* — Birch, Stewart, Kolasch & Birch, LLP

(57) ABSTRACT

Disclosed herein is an image display apparatus. The image display apparatus includes a display, an interface unit to exchange data with a mobile terminal, and a controller to control the display to display an execution icon to execute at least one of applications installed in the mobile terminal and, in response to selection of the execution icon, to display an execution image of at least one application corresponding to the execution icon. Thereby, mirroring between the mobile terminal and the image display apparatus may be simply performed.

19 Claims, 42 Drawing Sheets

(56) References Cited

U.S. PATENT DOCUMENTS

| | | | | |
|---|---|---|---|---|
| 2013/0210488 A1* | 8/2013 | Lee | ............... | G06F 9/452 |
| | | | | 455/557 |
| 2013/0326397 A1* | 12/2013 | Kim | ............... | G06F 3/0484 |
| | | | | 715/781 |
| 2014/0032635 A1* | 1/2014 | Pimmel | ............... | H04N 21/4126 |
| | | | | 709/203 |
| 2015/0065056 A1* | 3/2015 | Won | ............... | G06F 3/1462 |
| | | | | 455/41.3 |
| 2015/0148080 A1* | 5/2015 | Manges | ............... | G06F 3/1454 |
| | | | | 455/457 |

FOREIGN PATENT DOCUMENTS

| | | | |
|---|---|---|---|
| EP | 2629193 | A2 | 8/2013 |
| EP | 2669788 | A1 | 12/2013 |

\* cited by examiner

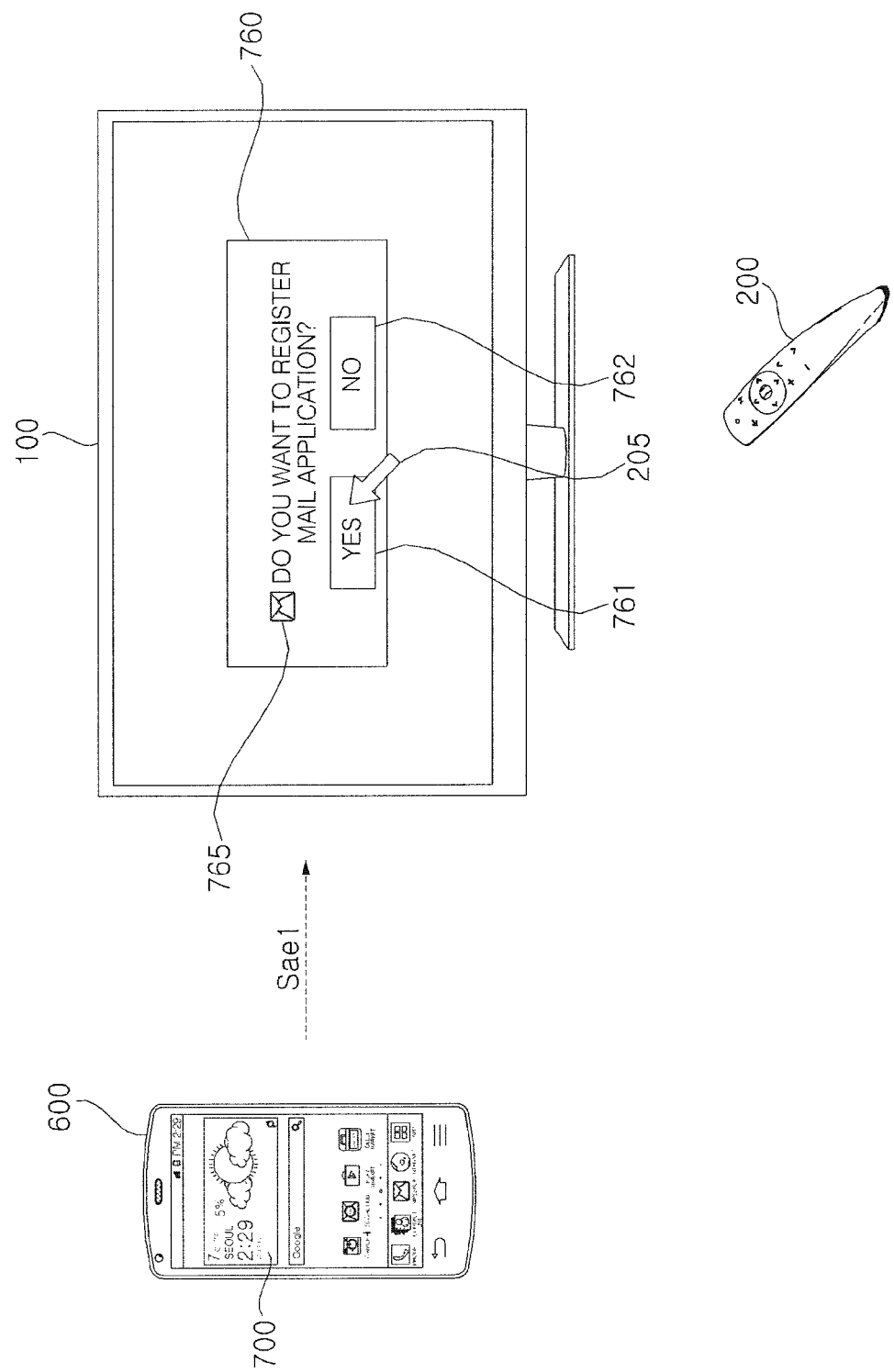

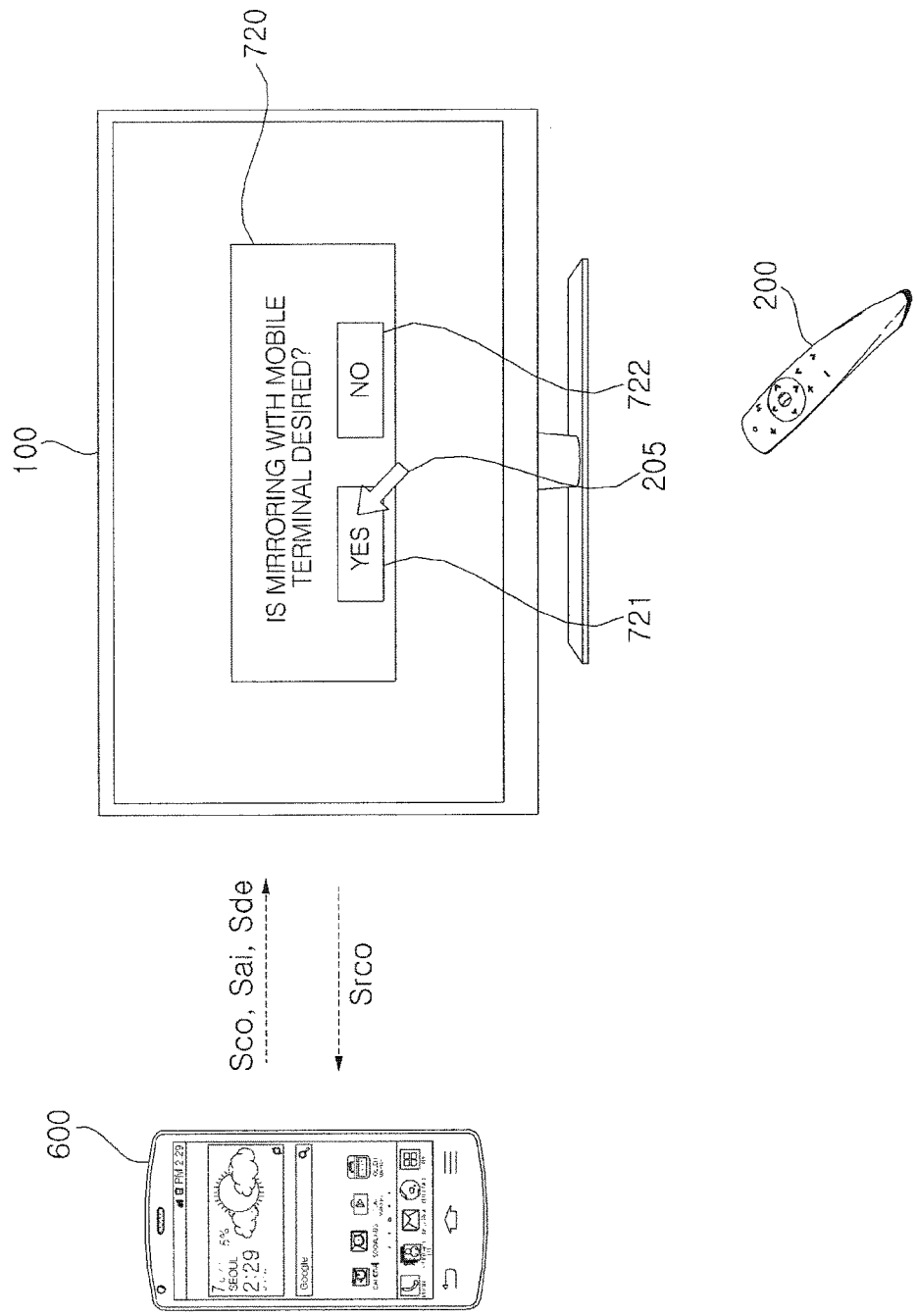

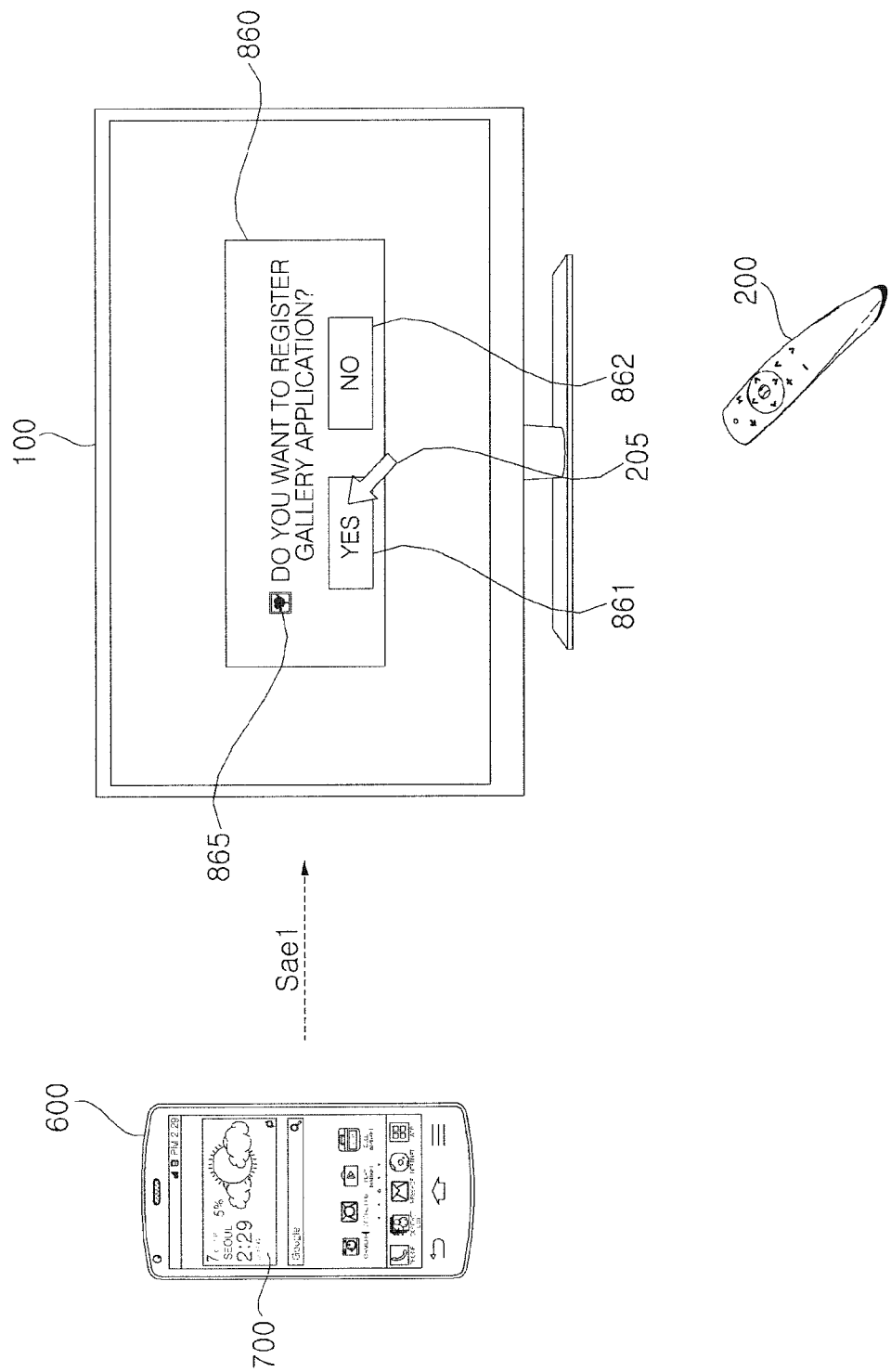

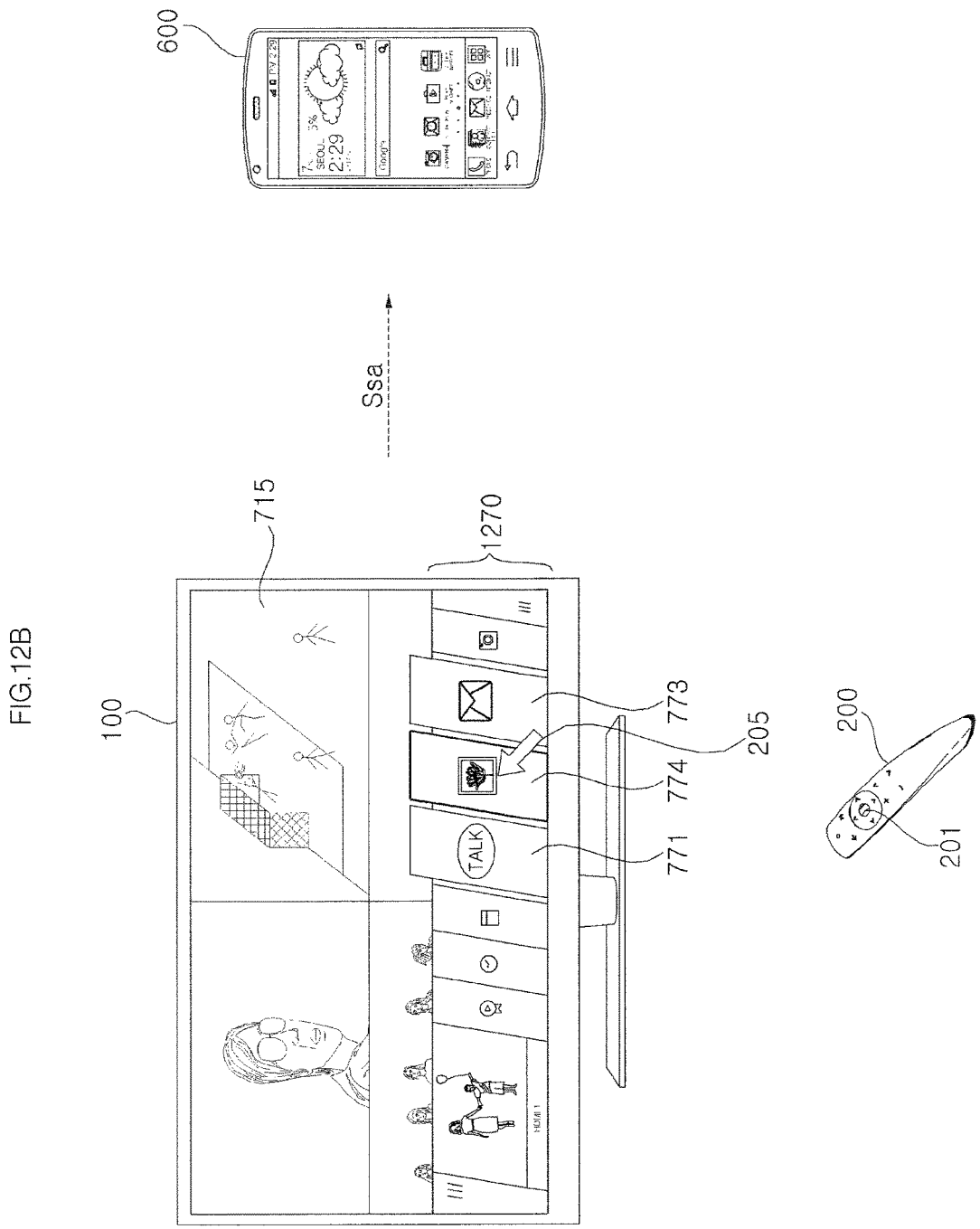

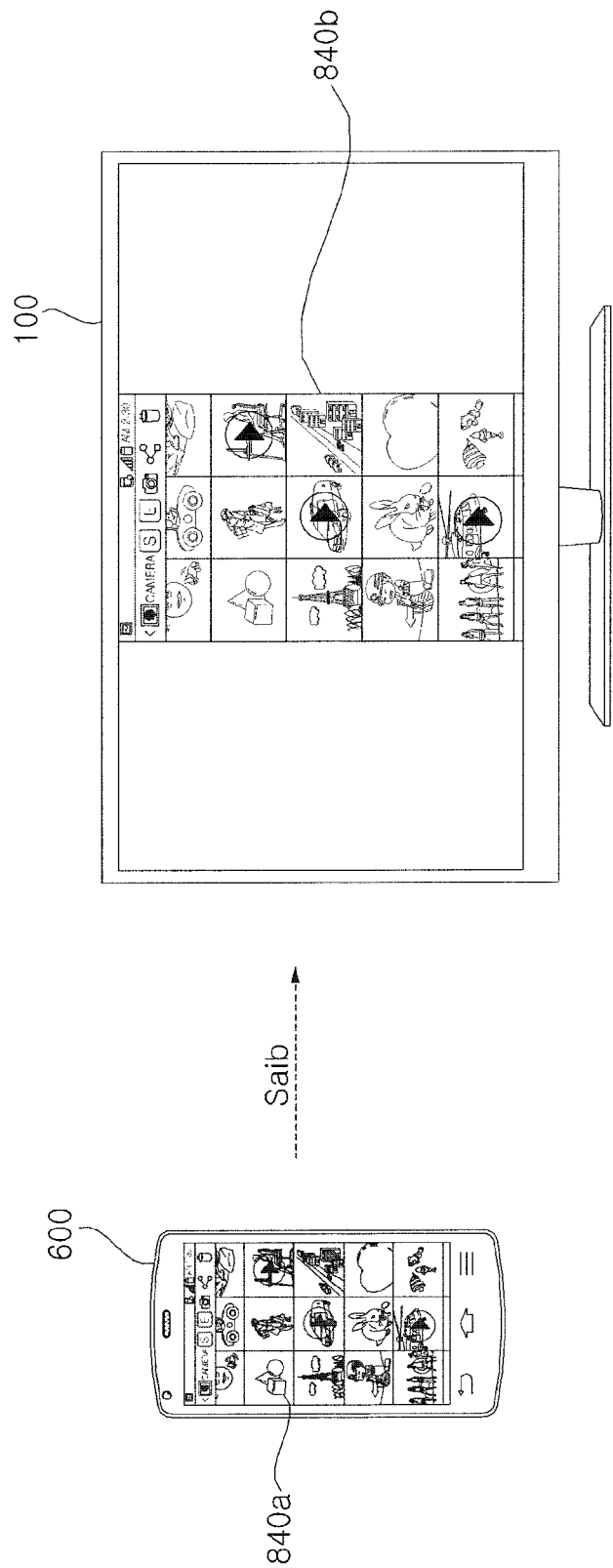

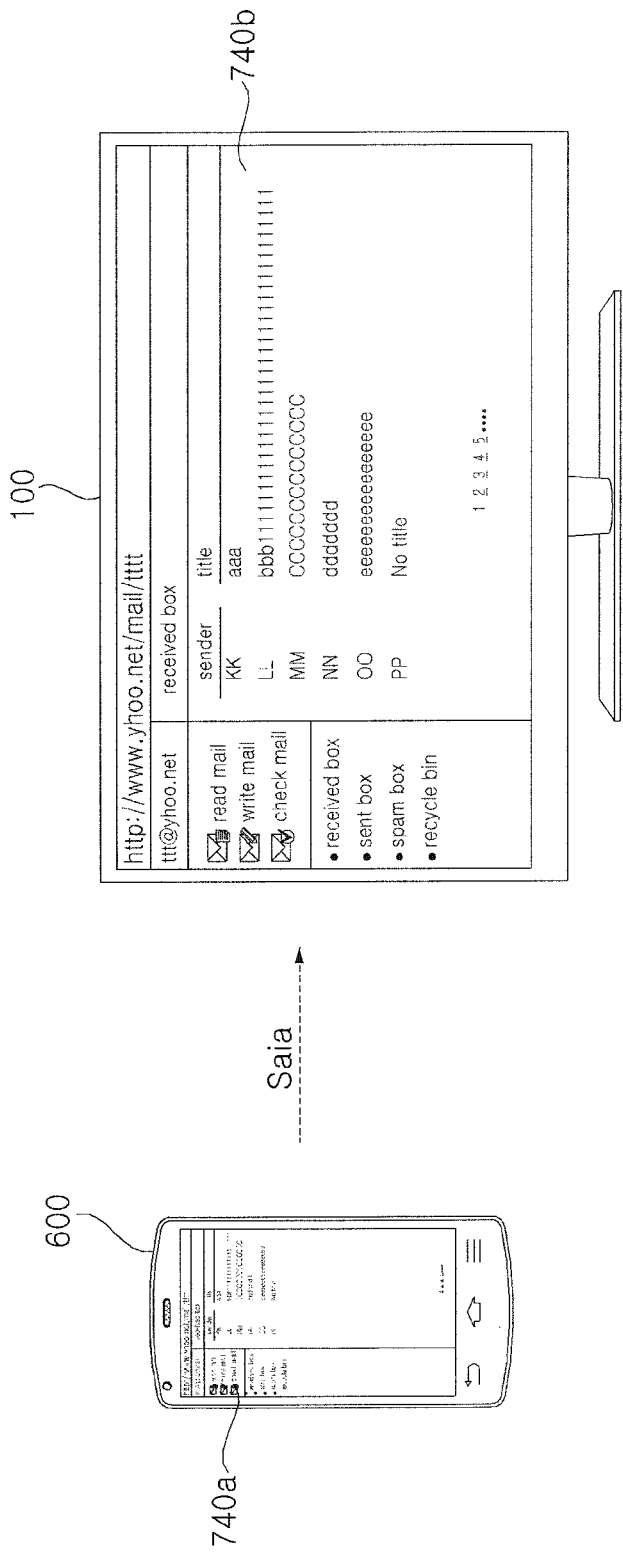

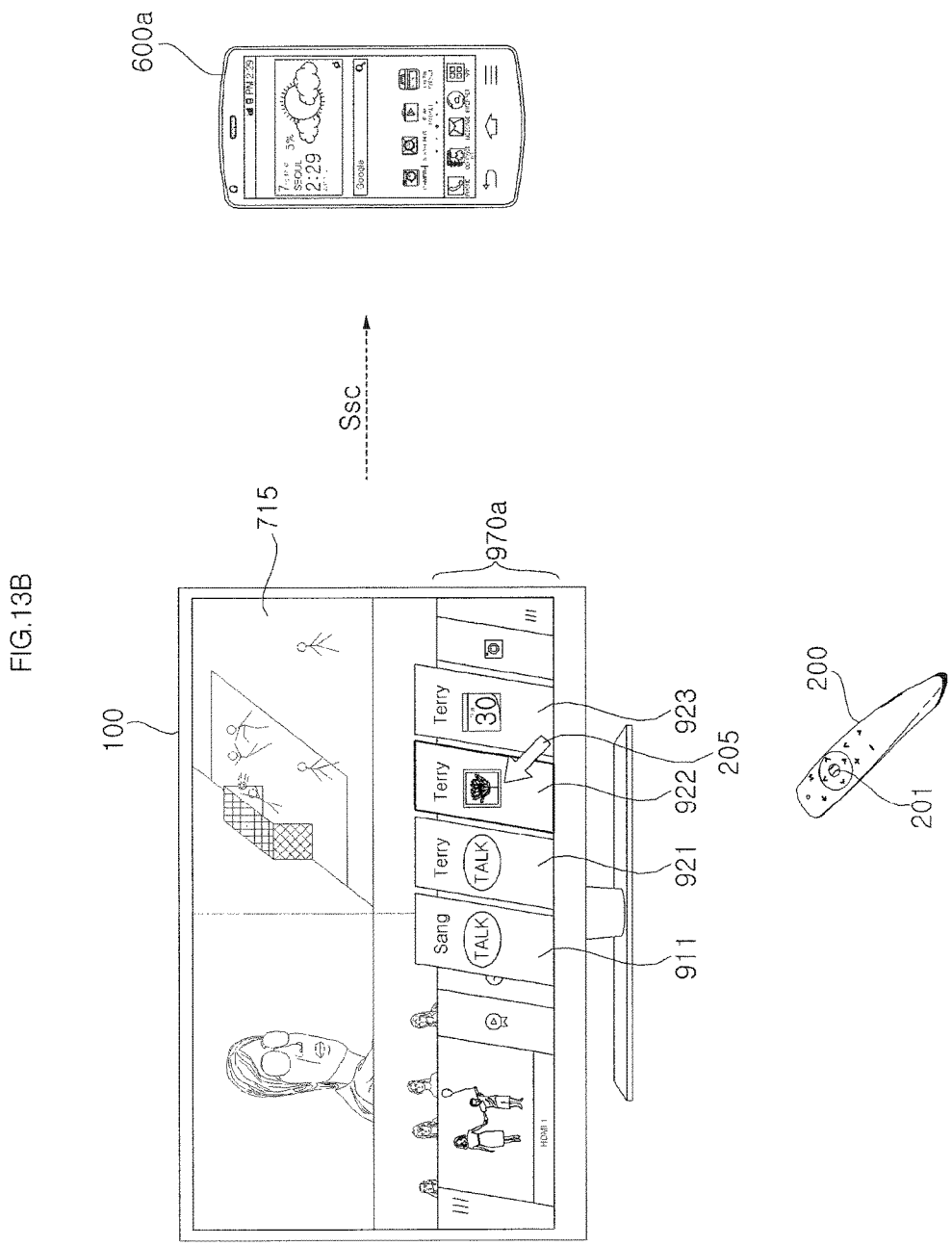

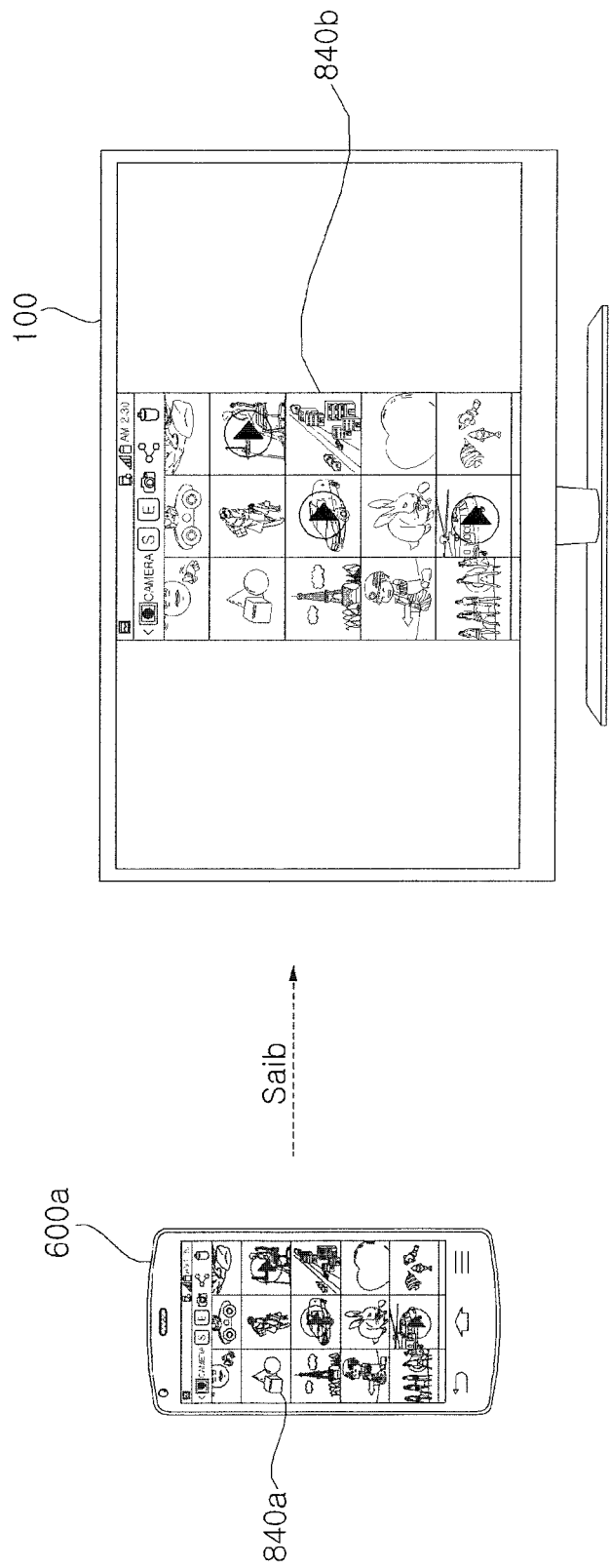

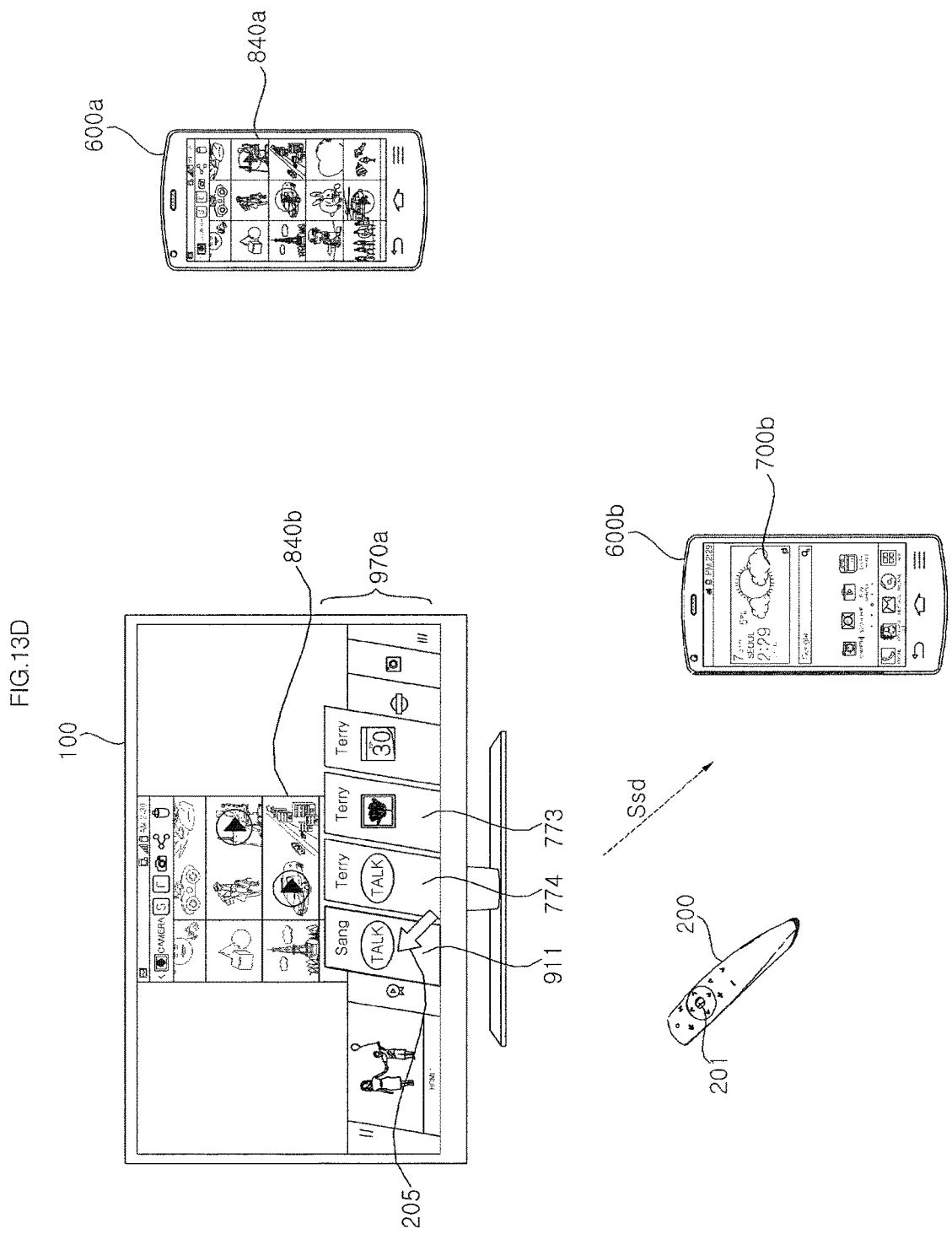

IMAGE DISPLAY APPARATUS

CROSS-REFERENCE TO RELATED APPLICATION

This application claims the benefit of Korean Patent Application No. 10-2015-0012235, filed on Jan. 26, 2015 in the Korean Intellectual Property Office, the disclosure of which is incorporated herein by reference.

BACKGROUND OF THE INVENTION

1. Field of the Invention

The present invention relates to an image display apparatus and, more particularly, to an image display apparatus which may simply execute mirroring between a mobile terminal and the image display apparatus.

2. Description of the Related Art

An image display apparatus is an apparatus having a function of providing an image viewable by a user. The user may watch broadcasts through the image display apparatus. The image display apparatus provides a broadcast selected by a user, among broadcast signals transmitted from broadcast stations, and such a broadcast image is displayed on a display. Recent, broadcasting is transitioning from analog broadcasting to digital broadcasting.

Digital broadcasting means broadcasting of digital image and voice signals. Digital broadcasting is resilient to external noise and thus has low data loss, is advantageous in error correction, and provides a high resolution and clear images, as compared to analog broadcasting. Further, digital broadcasting may execute interactive services, differing from analog broadcasting.

SUMMARY OF THE INVENTION

An object of the present invention is to provide an image display apparatus which may simply execute mirroring between a mobile terminal and the image display apparatus.

Another object of the present invention is to provide an image display apparatus which may simply generate and display an execution icon during mirroring between a mobile terminal and the image display apparatus.

The objects of the present invention are not limited to the above-mentioned objects and other objects that have not been mentioned above will become evident to those skilled in the art from the following description.

To achieve the above objects, there is provided an image display apparatus according to an exemplary embodiment of the present invention, including a display, an interface unit to exchange data with a mobile terminal, and a controller to control the display to display an execution icon to execute at least one of applications installed in the mobile terminal and, in response to selection of the execution icon, to display an image of at least one application corresponding to the execution icon.

To achieve the above objects, there is provided an image display apparatus according to an exemplary embodiment of the present invention, including a display, an interface unit to exchange data with a mobile terminal, and a controller to display an application list according to application list display input, to, if an execution icon, mirroring with the mobile terminal being executable, is selected from the application list, to transmit application information corresponding to the execution icon to the mobile terminal, and to display an execution image of at least one application received from the mobile terminal.

To achieve the above objects, there is provided an image display apparatus according to an exemplary embodiment of the present invention, including a display, an interface unit to exchange data with a mobile terminal, and a controller to receive device information, information of an application under execution and an image of the application under execution from the mobile terminal, to control the display to display the received application image, and, in response to conversion of the application into another application or termination of the application, to generate an execution icon of the application and to display the generated execution icon.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

The advantages and features of the present invention, and the way of attaining the same, will become apparent with reference to embodiments described below in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts.

The suffixes "module" and "unit" in elements used in description below are only given in consideration of ease in preparation of the specification and do not provide specific meanings or functions. Therefore, the suffixes "module" and "unit" may be used together.

Figure 1:
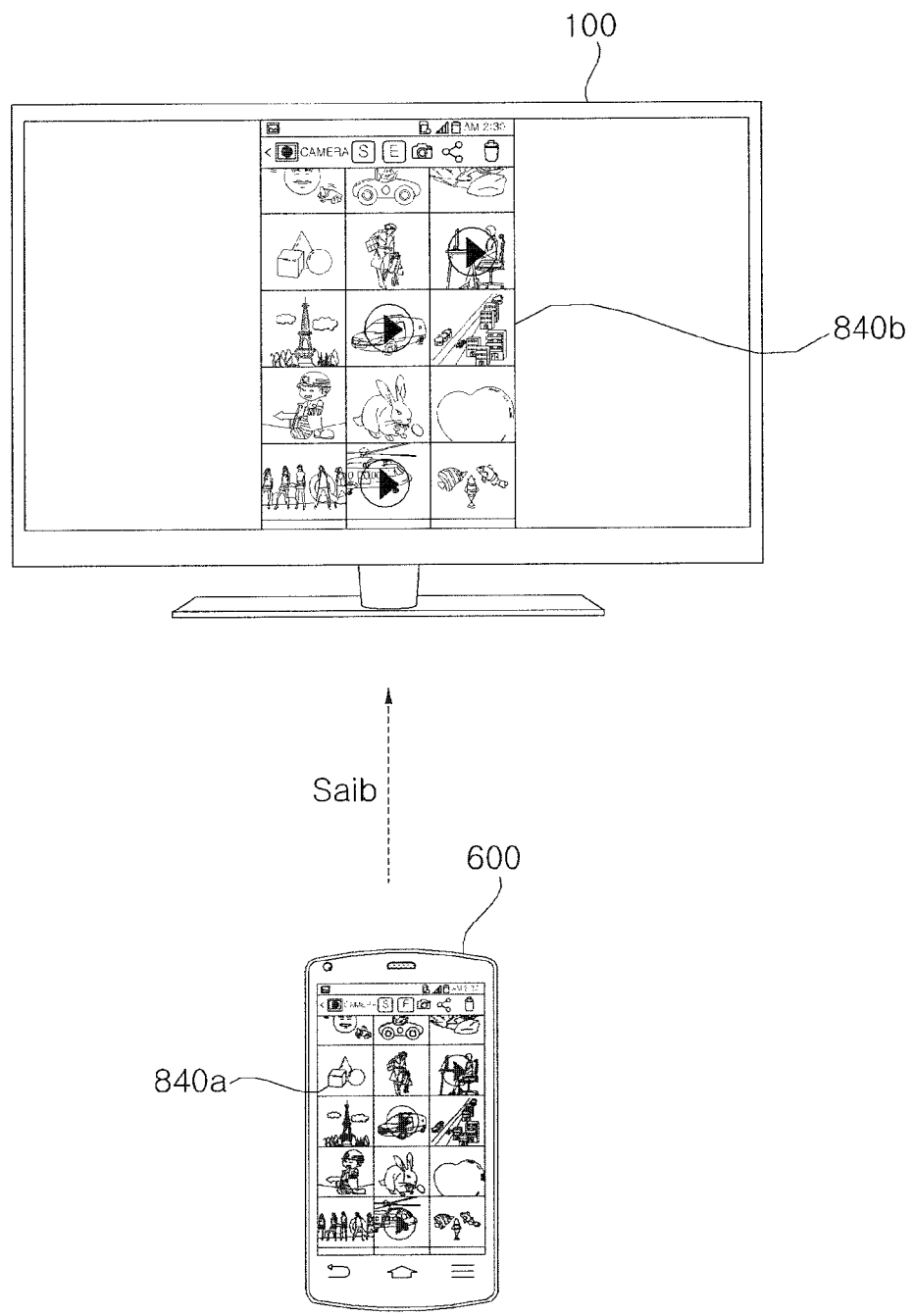
FIG. 1 is a view illustrating an image display apparatus in accordance with one embodiment of the present invention.

FIG. 1 is a view illustrating an image display apparatus and a mobile terminal in accordance with one embodiment of the present invention.

With reference to FIG. 1, an image display apparatus 100 and a mobile terminal 600 may execute mirroring.

FIG. 1 exemplarily describes that a wireless signal (Saib) of a gallery image 840a of a gallery application executed in the mobile terminal 600 is transmitted to the image display apparatus 100 and an enlarged gallery image 840b corresponding to the gallery application is displayed on the image display apparatus 100.

Since the size of a display 180 of the image display apparatus 100 is much greater than the size 680 (in FIG. 5) of the mobile terminal 600, a user may view an enlarged image through mirroring.

As one example of a mirroring execution method, if a mirroring mode is selected in the mobile terminal 600, the mobile terminal 600 transmits a pairing signal to the image display apparatus 100 wirelessly and the image display apparatus 100 transmits a pairing response signal corresponding to the pairing signal to the mobile terminal 600, the mobile terminal 600 and the image display apparatus 100 may be connected to each other. Here, Bluetooth-based wireless communication may be used as a first communication scheme.

Here, the mobile terminal 600 may include device information including a device ID, in addition to the pairing signal.

After connection, the mobile terminal 600 may transmit an application image related to mirroring, which is being executed, to the image display apparatus 100 wirelessly. Here, as one example, Miracast may be used as a communication scheme. The mobile terminal 600 may transmit the application image to the image display apparatus 100 wirelessly through Wi-Fi depending on Miracast and the image display apparatus 100 may receive the application image wirelessly through Wi-Fi depending on Miracast.

Further, in the present invention, for user convenience, a mirroring mode is executed in the image display apparatus 100. Particularly, a method in which mirroring is conveniently executed in the image display apparatus 100 is proposed.

A controller 170 of the image display apparatus 100 may display an execution icon to execute at least one of applications installed in the mobile terminal 600 and, in response to selection of the execution icon, display an execution image of at least one application corresponding to the execution icon. Thereby, mirroring between the mobile terminal 600 and the image display apparatus 600 may be simply executed.

The controller 170 of the image display apparatus 100 may display the execution icon, if the image display apparatus 100 is connected to the mobile terminal 600 wirelessly by the first communication scheme.

The controller 170 of the image display apparatus 100, in response to selection of the execution icon, may transmit application information corresponding to the execution icon to the mobile terminal 600 so that an application corresponding to the execution icon is executed, receive an image of the application executed by the mobile terminal 600 through an interface unit by a second communication scheme, and display the application image.

The controller 170 of the image display apparatus 100, if a designated application image is firstly received from the mobile terminal 600, may generate an execution icon of the corresponding application based on information of an application under execution, received together with the application image, by the mirroring mode. Therefore, during mirroring between the mobile terminal 600 and the image display apparatus 100, an execution icon may be simply generated and displayed.

Further, the image display apparatus 100, after the mirroring mode is terminated, may generate an execution icon of the corresponding application based on executed application information and display the generated execution icon.

Therefore, when the application under execution is terminated, an execution icon of the corresponding application may be generated and thus user convenience may be increased.

The image display apparatus 100, if the displayed execution icon is selected, may transmit application information corresponding to the execution icon to the mobile terminal 600 so that an application corresponding to the execution icon is executed in the mobile terminal 600. Therefore, mirroring may be simply performed by the execution icon selected by the image display apparatus 100.

The image display apparatus 100 may align and display a plurality of icons corresponding to a plurality of applications in the order of reception from the mobile terminal 600 or the order of execution by the mobile terminal 600.

The image display apparatus 100 may display an execution icon corresponding to received user information or mobile terminal information according to the user information or the mobile terminal information. Thereby, an execution icon suited to a user may be provided and thus user convenience may be increased.

The image display apparatus 100 may receive device information and application and images of applications under execution from a plurality of mobile terminals 600, and display the application images received from the mobile terminals 600 on a display through a screen division method. Thereby, respective users may view desired images.

Further, the image display apparatus 100 may receive device information, information of a first application under execution and an image of the first application under execution from the mobile terminal 600 at a first time, receive device information, information of a second application under execution and an image of the second application under execution from the mobile terminal at a second time subsequent to the first time, and, if a time difference between the first time and the second time is a designated time or less, display the first application image and the second application image on the display through the screen division method. That is, in the mirroring mode, screen division is carried out using a time machine function and, thus, user convenience may be increased.

Further, the image display apparatus 100 may be connected to the mobile terminal 600, set an application selected from a plurality of applications in the mobile terminal 600 as an application, in which mirroring is executable, and generate an execution icon corresponding to the set application.

The image display apparatus 100 may display an application image together with a broadcast image based on a broadcast signal. Thereby, a user may view both the broadcast image and the image of an application executed by the mobile terminal 600 through a large-scale screen.

The image display apparatus 100 may transmit at least one of recent execution time information and image file information of an application under execution in the mobile terminal 600 or an application image to the mobile terminal 600.

The image display apparatus 100 may automatically display an application list including a first execution icon corresponding to a first mobile terminal 600, when the intensity of a wireless signal received from the first mobile terminal 600 is a designated intensity or more, and automatically display an application list including the first execution icon and a second execution icon corresponding to a second mobile terminal 600, when the intensity of a wireless signal received from the second mobile terminal 600 is a designated intensity or more in a state in which the application list including the first execution icon is displayed. Thereby, execution icons may be automatically displayed and thus user convenience may be increased.

The image display apparatus 100 may display an application list according to application list display input and, if an execution icon, in which mirroring with the mobile terminal 600 is executable, is selected from the application list, to transmit application information corresponding to the execution icon to the mobile terminal 600. Thereby, mirroring may be simply performed by the execution icon selected by the image display apparatus 100.

Various operation methods of the above-described image display apparatus 100 will be described in more detail with reference to the accompanying drawings starting from FIG. 6.

The image display apparatus 100 of FIG. 1 may be a monitor, a TV, or a tablet PC.

Figure 2:
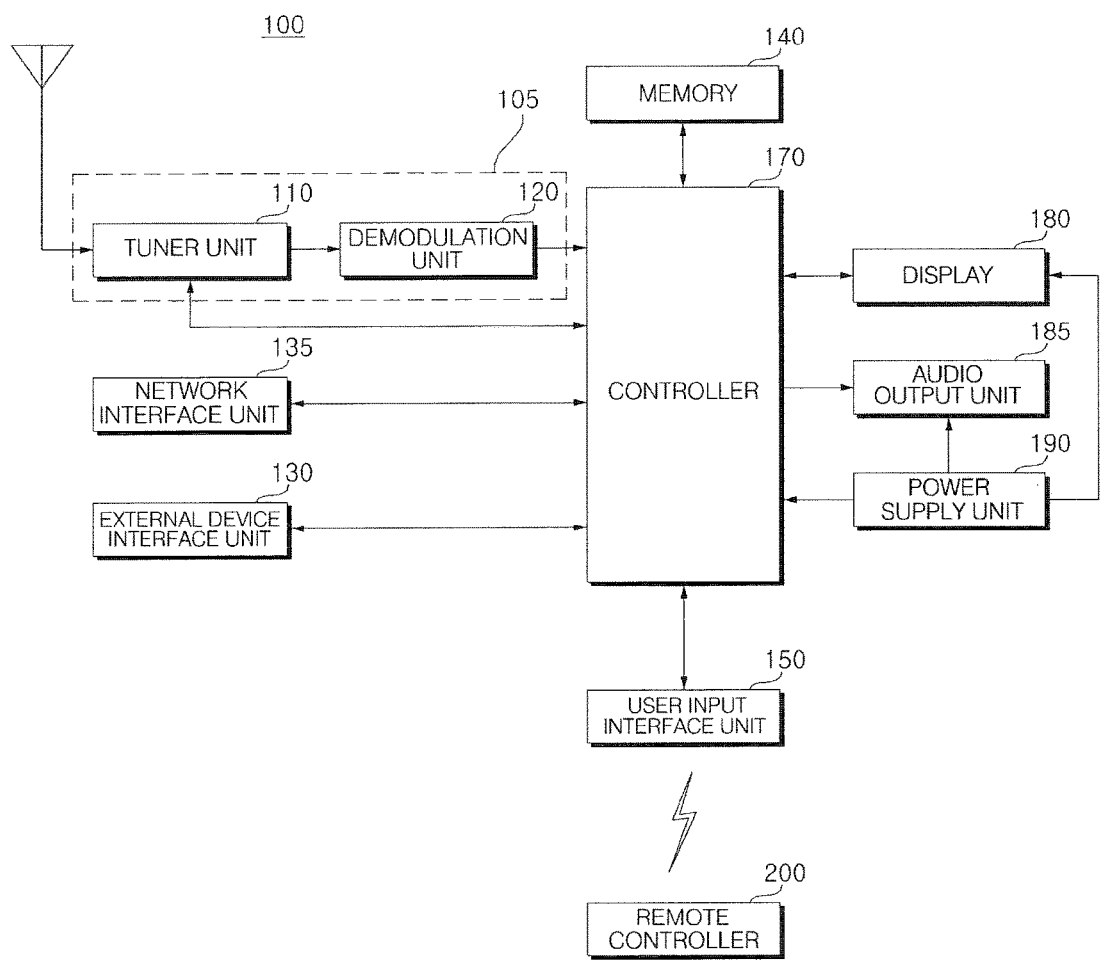
FIG. 2 is an exemplary inner block diagram of the image display apparatus of FIG. 1.

FIG. 2 is an exemplary inner block diagram of the image display apparatus of FIG. 1.

With reference to FIG. 2, the image display apparatus 100 in accordance with one embodiment of the present invention may include a broadcast reception unit 105, an external device interface unit 130, a memory 140, a user input interface unit 150, a sensor unit (not shown), the controller 170, a display 180, and an audio output unit 185.

The broadcast reception unit 105 may include a tuner unit 110, a demodulation unit 120, a network interface unit 135 and the external device interface unit 135.

Differing from FIG. 2, the broadcast reception unit 105 may include only the tuner unit 110, the demodulation unit 120 and the external device interface unit 130. That is, the broadcast reception unit 105 may exclude the network interface unit 135.

The tuner unit 110 selects a radio frequency (RF) broadcast signal corresponding to a channel selected by a user or all channels, pre-stored, from RF broadcast signals received through an antenna (not shown). Further, the tuner unit 110 converts the selected RF broadcast signal into an intermediate frequency signal or a baseband image or voice signal.

As one example, if the selected RF broadcast signal is a digital broadcast signal, the tuner unit 110 converts the digital broadcast signal into a digital IF (DIF) signal and, if the selected RF broadcast signal is an analog broadcast signal, the tuner unit 110 converts the analog broadcast signal into an analog baseband image or voice (CVBS/SIF) signal. That is, the tuner unit 110 may process a digital broadcast signal or an analog broadcast signal. The analog baseband image or voice (CUBS/SIF) signal output from the tuner unit 110 may be directly input to the controller 170.

The tuner unit 110 may sequentially select RF broadcast signals of all broadcast channels stored through a channel memory function, among RF broadcast signals received through the antenna in the present invention, and convert the RF broadcast signals into intermediate frequency signals or baseband image or voice signals.

The tuner unit 110 may have a plurality of tuners to receive broadcast signals of a plurality of channels. Otherwise, the tuner unit 110 may have a single tuner to simultaneously receive broadcast signals of a plurality of channels.

The demodulation unit 120 receives a digital IF (DIF) signal converted by the tuner 110 and performs demodulation of the DIF signal.

The demodulation unit 120 may perform demodulation and channel decoding and then output a stream signal TS. Here, the stream signal may be a signal in which an image signal, a voice signal or a data signal is multiplexed.

The stream signal output from the demodulation unit 120 may be input to the controller 170. The controller 170 performs demultiplexing and image/voice signal processing and then outputs an image to the display 180 and outputs a voice to the audio output unit 185.

The external device interface unit 130 may transmit or receive data to or from a connected external device (not shown), for example, set-top box. For this purpose, the external device interface unit 130 may include an A/V input/output unit (not shown)

The external device interface unit 130 may be connected to external devices, such as a digital versatile disc (DVD) player, a Blue-ray player, a game console, a camera, a camcorder, a computer (a notebook), a set-top box, etc., by wire/wirelessly, and perform input/output operation with the external device.

The A/V input/output unit may receive image and voice signals from the external device. Further, a wireless communication unit (not shown) may perform near field wireless communication with other electronic devices.

Through such a wireless communication unit (not shown), the external device interface unit 130 may exchange data with the adjacent mobile terminal 600. Particularly, the external device interface unit 130 may receive device information, information of an application under execution and an image of the application under execution from the mobile terminal 600.

The network interface unit 135 provides an interface to connect the image display apparatus 100 to a wired/wireless network including an Internet network. As one example, the network interface unit 135 may receive content or data provided via the Internet, a content provider or a network operator through the network.

The network interface unit 135 may include the wireless communication unit (not shown).

The memory 140 may store programs to process and control respective signals within the controller 170 or to store the processed image, voice or data signal.

Further, the memory 140 may perform a function of temporarily storing an image, voice or data signal input to the external device interface unit 130. Further, the memory 140 may store information regarding a designated broadcast channel through the channel memory function, such as a channel map.

FIG. 2 illustrates the memory 140 as being provided separately from the controller 170, but the disclosure of the present invention is not limited thereto. The controller 170 may include the memory 140.

The user input interface unit 150 transmits a signal input by a user to the controller 170 or transmits a signal from the controller 170 to the user.

As one example, the user input interface unit 150 may receive/transmit a user input signal, such as power on/off, channel selection or screen setup, from/to a remote controller 200, transmit a user input signal input through a local key (not shown), such as a power key, a channel key, a volume key or a setup key, to the controller 170, transmit a user input signal input from the sensor unit (not show) to sense a user's gesture to the controller 170, or transmit a signal from the controller 170 to the sensor unit (not shown).

The controller 170 may generate and output a signal for image or voice output by demultiplexing an input stream or processing demultiplexed signals through the tuner unit 110, demodulation unit 120, the network interface unit 135 or the external device interface unit 130.

An image signal processed by the controller 170 may be input to the display 180 and an image corresponding to the corresponding image signal may be displayed on the display 180. Further, the image signal processed by the controller 170 may be input to an external output device through the external device interface unit 130.

A voice signal processed by the controller 170 may be output to the audio output unit 185. Further, the voice signal processed by the controller 170 may be input to the external output device through the external device interface unit 130.

Although not shown in FIG. 2, the controller 170 may include a demultiplexer, an image processing unit, etc. These elements will be described later with reference to FIG. 3.

In addition, the controller 170 may control the overall operation of the image display device 100. As one example, the controller 170 may control the tuner unit 110 so that RF broadcast corresponding to a channel selected by a user or a pre-stored channel is tuned to.

Further, the controller 170 may control the image display apparatus 100 by a user command input through the user input interface unit 150 or an internal program.

The controller 170 may control the display 180 to display an image. Here, the image displayed on the display 180 may be a still image or a moving picture and be a 2D image or a 3D image.

The controller 170 may display a designated 2D object within an image displayed on the display 180. As one example, the object may be at least one of a connected web screen (a newspaper, a magazine, etc.), an electronic program guide (EPG), various menus, a widget, an icon, a still image, a moving picture, and text.

The controller 170 may recognize the position of a user based on an image captured by a photographing unit (not shown). As one example, the controller 170 may detect a distance (a y coordinate) between the user and the image display apparatus 100. In addition, the controller 170 may detect x and y coordinates of a point within the display 180 corresponding to the position of the user.

The display 180 may generate a driving signal converted from an image signal, a data signal, an OSD signal or a control signal processed by the controller 170, or an image signal, a data signal or a control signal received by the external device interface unit 130.

The display 180 may be a PDP, an LCD, an OLED or a flexible display, or be a 3D display. 3D displays may be divided into an auto-stereoscopic type and a stereoscopic type.

The display 180 may be a touchscreen and thus used as an input device as well as an output device.

The audio output unit 185 may receive a voice signal processed by the control 170 and then output a voice.

The photographing unit (not shown) photographs a user. The photographing unit (not shown) may include one camera but the disclosure of the present invention is not limited thereto. That is, the photographing unit (not shown) may include a plurality of cameras. The photographing unit (not shown) may be buried under the upper surface of the display 180 of the image display apparatus 100 or be disposed separately from the display 180. Image information captured by the photographing unit (not shown) may be input to the controller 170.

The controller 170 may sense a user's gesture based on an image captured by the photographing unit (not shown), a signal sensed by the sensor unit (not shown) or a combination thereof.

A power supply unit 190 supplies corresponding power to the entirety of the image display apparatus 100. Particularly, the power supply unit 190 may supply power to the controller 170 implemented as a system on chip (SOC), the display 180 to display an image and the audio output unit 185 to output sound.

Concretely, the power supply unit 190 may include a converter to convert AC power into DC power and a DC/DC converter to convert the level of DC power.

The remote controller 200 transmits user input to the user input interface unit 150. For this purpose, the remote controller 200 may use Bluetooth communication, radio frequency (RF) communication, infrared (IR) communication, ultra wideband (UWB) communication and ZigBee communication. Further, the remote controller 200 may receive an image, voice or data signal output from the user input interface unit 150 and display the signal or output the signal as a voice.

The above-described image display apparatus 100 may be a fixed or mobile digital broadcast receiver which may receive digital broadcast.

FIG. 2 is a block diagram of the image display apparatus 100 in accordance with one embodiment of the present invention. The respective elements of the block diagram may be unified, added or omitted according to specifications of the image display apparatus 100 as substantially implemented. That is, as needed, two or more elements may be unified into one element, or one element may be segmented into two or more elements. Further, functions performed by respective blocks are only to describe the embodiment of the present invention and detailed operations or devices thereof do not limit the scope of the present invention.

Figure 3:
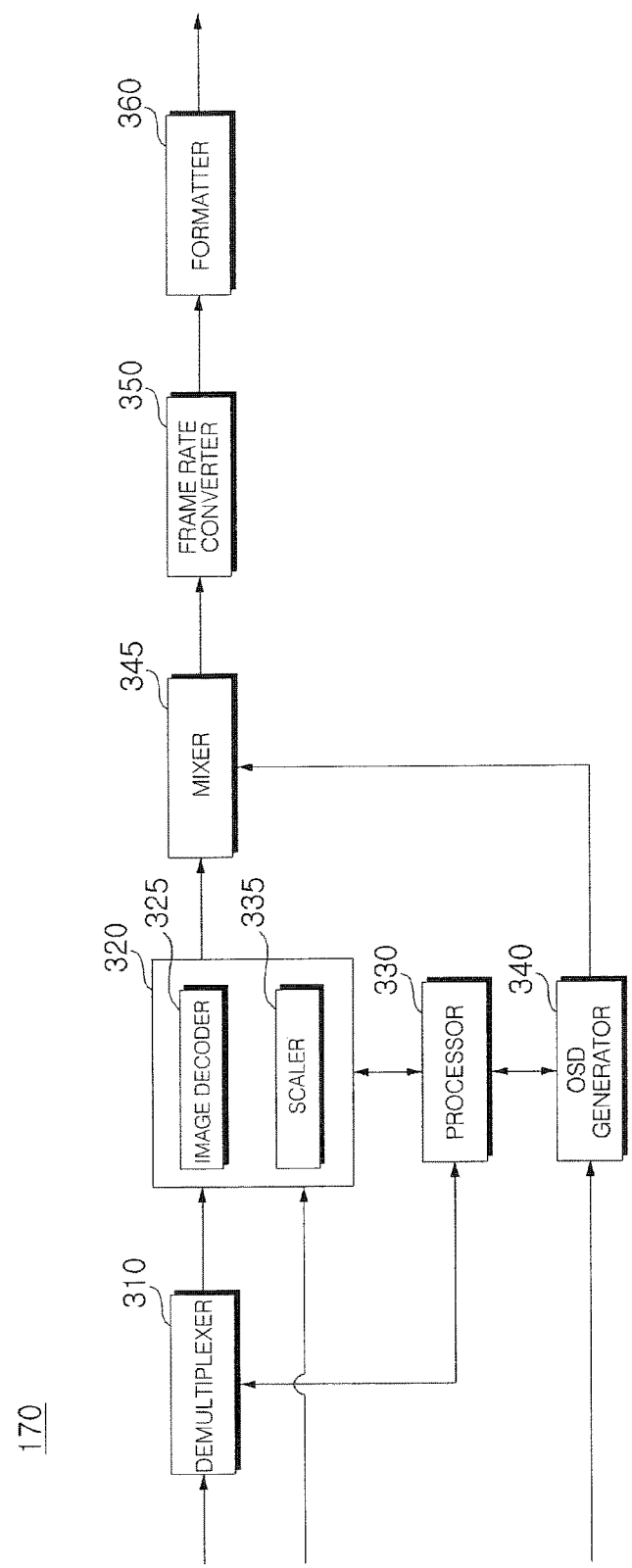
FIG. 3 is an exemplary inner block diagram of a controller of FIG. 2.

FIG. 3 is an exemplary inner block diagram of the controller of FIG. 2.

With reference to FIG. 3, the controller 170 in accordance with one embodiment of the present invention may include a demultiplexer 310, an image processing unit 320, a processor 330, an Osd generator 330, a mixer 345, a frame rate converter 350, and a formatter 360. In addition, the controller 170 may further include an audio processing unit (not shown) and a data processing unit (not shown).

The demultiplexer 310 demultiplexes an input stream. As one example, an MPEG-2 TS is input to the demultiplexer 310, the demultiplexer 310 may demultiplex the MPEG-2 TS and thus separate the MPEG-2 TS into image, voice and data signals. Here, a stream signal input to the demultiplexer 310 may be a stream signal output from the tuner unit 110, the demodulation unit 120 or the external device interface unit 130.

The image processing unit 320 may perform processing of a demultiplexed image signal. For this purpose, the image processing unit 320 may include an image decoder 325 and a scaler 335.

The image decoder 325 decodes the demultiplexed image signal and the scaler 335 performs scaling of the resolution of the decoded image signal so that the image signal may be output from the display 180.

The image decoder 325 may be one of decoders having various standards. As one example, the image decoder 325 may be an MPEG-2 decoder, a H.264 decoder, a 3D image decoder for color and depth images, or a decoder for multi-view images.

The processor 330 may control the overall operation of the image display apparatus 100 or the controller 170. As one example, the processor 330 may control the tuner unit 110 so as to tune to RF broadcast corresponding to a channel selected by a user or a pre-stored channel.

Further, the processor 330 may control the image display apparatus 100 by a user command input through the user input interface unit 150 or an internal program.

Further, the processor 330 may control data transmission with the network interface unit 135 or the external device interface unit 130.

Further, the processor 330 may control operation of the demultiplexer 310, the image processing unit 320, the Osd generator 340, etc. in the controller 170.

The Osd generator 340 generates an OSD signal according to user input or autonomously. As one example, the Osd generator 340 may generate a signal to display various pieces of information as graphics or text on the screen of the display 180 based on a user input signal. The generated OSD signal may include various pieces of data, such as a user interface picture, various menu pictures, widgets and icons of the image display apparatus 100. Further, the generated OSD signal may include a 2D object or a 3D object.

Further, the Osd generator 340 may generate a pointer, which may be displayed on the display 180, based on a pointing signal input from the remote controller 200. Particularly, such a pointer may be generated by a pointing signal processing unit and the Osd generator 240 may include such a pointing signal processing unit (not shown). Of course, the pointing signal processing unit (not shown) may be provided separately from the Osd generator 240.

The mixer 345 may mix the OSD signal generated by the Osd generator 340 and the decoded image signal processed by the image processing unit 320. The mixed image signal is provided to the frame rate converter 350.

The frame rate converter (FRC) 350 may convert the frame rate of an input image. Further, the frame rate converter 350 may output the input image without conversion of the frame rate of the input image.

The formatter 360 may arrange a left eye image frame and a right eye image frame of a 3D image, the frame rate of which has been converted. Further, the formatter 360 may output a synchronization signal (Vsync) to open a left eye glass and a right eye glass of a 3D viewing device (not shown).

The formatter 360 may convert the format of an input image signal into a format of an image signal to be displayed on the display 180 and then output the image signal.

Further, the formatter 360 may convert the format of a 3D image signal into any one of various 3D formats. As one example, the formatter 360 may convert the format of a 3D image signal into one of a side by side format, a top/down format, a frame sequential format, an interlaced format, a checker box format, etc.

The formatter 360 may convert a 2D image signal into a 3D image signal. As one example, the formatter 360 may detect an edge or a selectable object from the 2D image signal and separate and generate a 3D image signal from an object according to the detected edge or the detected selectable object according to a 3D image generation algorithm. Here, the generated 3D image signal may be separated into a left eye image signal (L) and a right eye image signal (R) and then the left eye image signal (L) and the right eye image signal (R) may be arranged, as described above.

Although not shown in the drawings, a 3D processor (not shown) for 3-dimensional effect signal processing may be further disposed after the formatter 360. Such a 3D processor (not shown) may perform brightness, tint and color adjustment so as to improve 3D effects. As one example, the 3D processor may perform signal processing in which an object of a short distance is clear and an object of a long distance is blurry. The functions of the 3D processor may be combined with the formatter 360 or the image processing unit 320.

The audio processing unit (not shown) in the controller 170 may process a demultiplexed voice signal. For this purpose, the audio processing unit (not shown) may have various decoders.

Further, the audio processing unit (not shown) in the controller 170 may perform bass, treble and volume adjustment.

The data processing unit (not shown) in the controller 170 may process a demultiplexed data signal. As one example, if the demultiplexed data signal is a coded data signal, the data processing unit may decode the coded data signal. The coded data signal may be electronic program guide information including broadcast information, such as start times, end times, etc. of broadcast programs on the air of respective channels.

FIG. 3 is a block diagram of the controller 170 in accordance with one embodiment of the present invention. The respective elements of the block diagram may be unified, added or omitted according to specifications of the controller 170 as substantially implemented.

Particularly, the frame rate converter 350 and the formatter 360 may be excluded from the controller 170 and be respectively provided separately from the controller 170 or provided as one module separately from the controller 170.

Figure 4A:
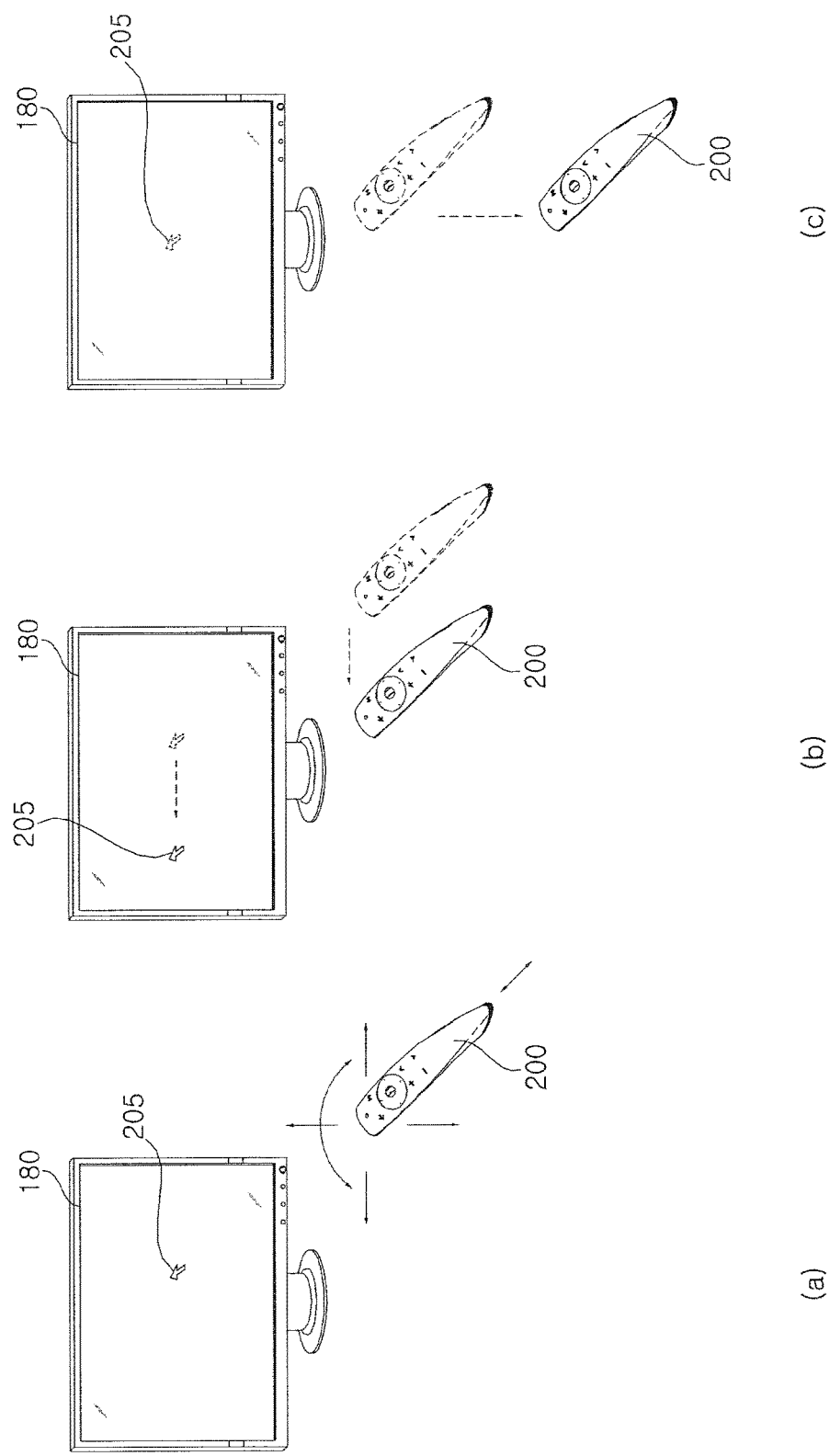
FIG. 4A is a view illustrating a control method of a remote controller of FIG. 2

FIG. 4A is a view illustrating a control method of a remote controller of FIG. 2.

As exemplarily shown in (a) of FIG. 4A, a pointer 205 corresponding to the remote controller 200 is displayed on the display 180.

A user may rotate and move the remote controller 200 up and down, left and right ((b) of FIG. 4A), and back and forth ((c) of FIG. 4A). The pointer 205 displayed on the display 180 of the image display apparatus 100 corresponds to movement of the remote controller 200. Since the pointer 205 corresponding to the remote controller 200 moves according to movement of the remote controller 200 in a 3D space, the remote controller 200 may be referred as a space remote controller or a 3D pointing device.

(b) of FIG. 4A exemplarily illustrates that, when a user moves the remote controller 200 left, the pointer 205 displayed on the display 180 of the image display apparatus moves left correspondingly.

Information regarding movement of the remote controller 200 sensed by a sensor of the remote controller 200 is transmitted to the image display apparatus 100. The image display apparatus 100 may calculate coordinates of the pointer 205 from the information regarding movement of the remote controller 200. The image display apparatus 100 may display the pointer 205 at a position corresponding to the calculated coordinates.

(c) of FIG. 4A exemplarily illustrates that a user moves the remote controller 200 far away from the display 180 of the image display apparatus under the condition that the user presses a specific button of the remote controller 200. Thereby, a selected region within the display 180 corresponding to the pointer 205 may be zoomed in and thus enlarged. On the other hand, if the user moves the remote controller 200 close to the display 180, the selected region within the display 180 corresponding to the pointer 205 may be zoomed out and thus reduced. Otherwise, the selected region may be zoomed out if the remote controller 200 becomes far away from the display 180 and be zoomed in if the remote controller 200 becomes close to the display 180.

Under the condition that a specific button of the remote controller 200 is pressed, recognition of up and down movement and left and right movement of the remote controller 200 may be excluded. That is, if the remote controller 200 moves far away from or close to the display 180, up, down, left and right movement of the remote controller 200 is not recognized but only back and forth movement of the remote controller 200 may be recognized. Under the condition that the specific button of the remote controller 200 is not pressed, the pointer 205 alone moves according to up, down, left and right movement of the remote controller 200.

The movement speed or movement direction of the pointer 205 may correspond to the movement speed or movement direction of the remote controller 200.

Figure 4B:
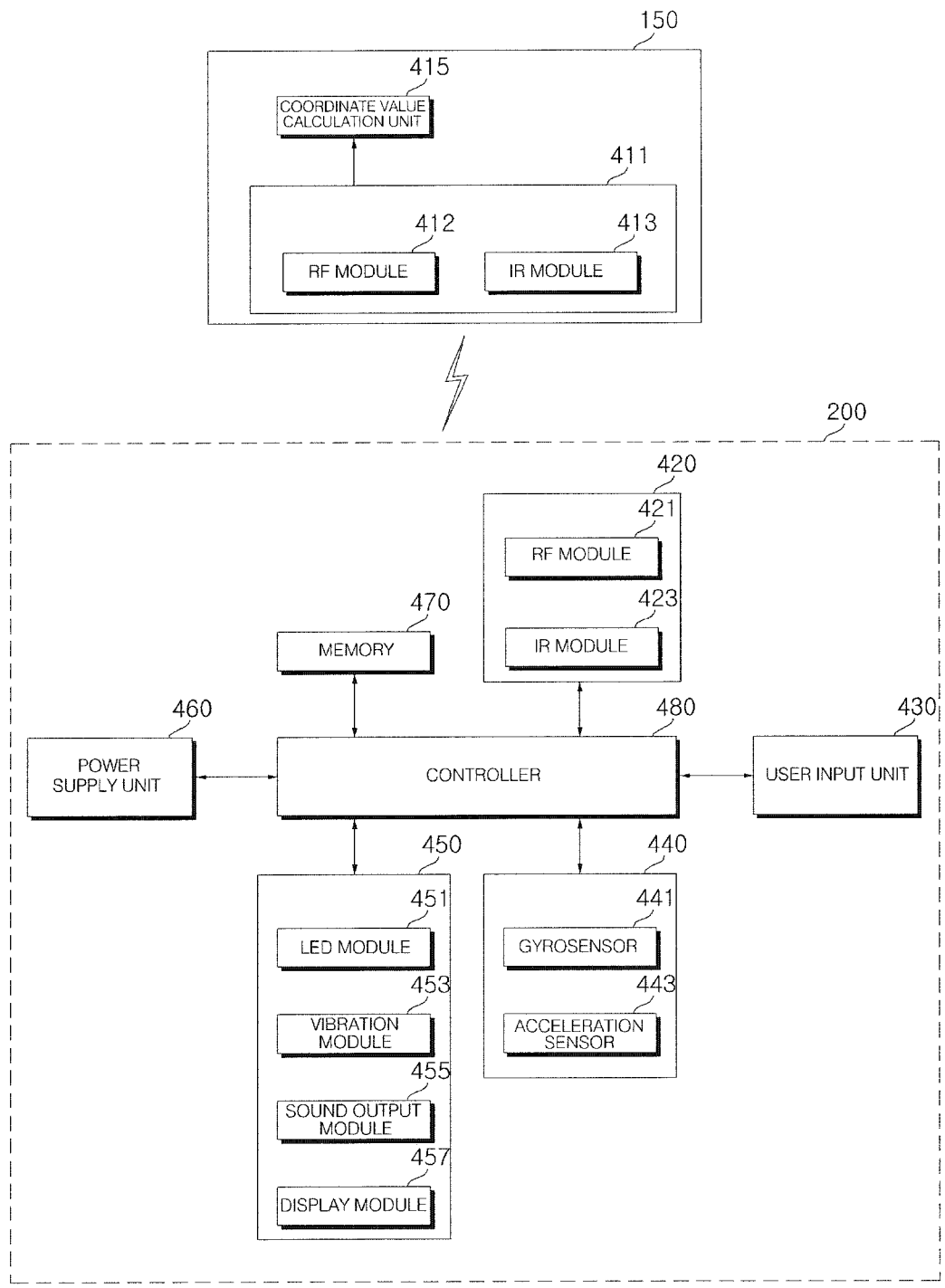
FIG. 4B is an inner block diagram of the remote controller of FIG. 2.

FIG. 4B is an inner block diagram of the remote controller 200 of FIG. 2.

With reference to FIG. 2, the remote controller 200 may include a wireless communication unit 425, a user input unit 435, a sensor unit 440, an output unit 450, a power supply unit 460, a memory 470, and a controller 480.

The wireless communication unit 425 transmits/receives a signal to/from an arbitrary one of image display apparatuses in accordance with embodiments of the present invention. Among the image display apparatuses in accordance with embodiments of the present invention, one image display apparatus 100 will be exemplarily described.

In this embodiment, the remote controller 200 may include an RF module 421 which may receive/transmit a signal from/to the image display apparatus 100 according to an RF communication standard. Further, the remote controller 200 may include an IR module 423 which may receive/transmit a signal from/to the image display apparatus 100 according to an IR communication standard.

In this embodiment, the remote controller 200 transmits a signal including information regarding movement of the remote controller 200 to the image display apparatus 100 through the RF module 421.

Further, the remote controller 200 may receive a signal transmitted from the image display apparatus 100 through the RF module 421. Further, the remote controller 200 may transmit a command regarding power on/off, channel change, volume adjustment, etc. to the image display apparatus 100 through the IR module 423, as needed.

The user input unit 435 may include a keypad, buttons, a touch pad, or a touchscreen. A user may input a command regarding the image display apparatus 100 to the remote controller 200 by manipulating the user input unit 435. If the user input unit 435 includes a hard key button, a user may input a command regarding the image display apparatus 100 to the remote controller 200 by pushing the hard key button. If the user input unit 435 includes a touchscreen, a user may input a command regarding the image display apparatus 100 to the remote controller 200 by touching a soft key of the touchscreen. Further, the user input unit 435 may include various input means which may be manipulated by a user, such as a scroll key, a jog key, etc., but the disclosure of the present invention is not limited thereto.

The sensor unit 440 may include a gyrosensor 441 and an acceleration sensor 443. The gyrosensor 441 may sense information regarding movement of the remote controller 200.

As one example, the gyrosensor 441 may sense information regarding operation of the remote controller 200 about x, y, and z axes. The acceleration sensor 443 may sense information regarding the movement speed of the remote controller 200. The sensor unit 440 may further include a distance measurement sensor and the distance measurement sensor may sense distance from the display 180.

The output unit 450 may output an image or voice signal corresponding to manipulation of the user input unit 435 or corresponding to a signal transmitted from the image display apparatus 100. Through the output unit 450, a user may recognize whether or not the user input unit 435 is manipulated or whether or not the image display apparatus 100 is controlled.

As one example, the output unit 450 may include an LED module 451 lighted on when the user input unit 435 is manipulated or a signal is received from or transmitted to the image display apparatus 100 through the wireless communication unit 425, a vibration module 453 to generate vibration, a sound output module 455 to output sound, and a display module 457 to output an image.

The power supply unit 460 supplies power to the remote controller 200. If the remote controller 200 is not moved for a designated time, the power supply unit 460 stops supply of power and may thus reduce power consumption. The power supply unit 460 may resume supply of power if a designated key provided in the remote controller 200 is operated.

The memory 470 may store various kinds of programs and application data necessary to control or operate the remote controller 200. If the remote controller 200 receives/transmits a signal from/to the image display apparatus 100 wirelessly through the RF module 421, the remote controller 200 and the image display apparatus 100 may receive/transmit signals from/to each other through a designated frequency band. The controller 480 of the remote controller 200 may store information regarding a frequency band, in which the remote controller 200 may receive/transmit a signal from/to the image display apparatus 100 pairing with the remote controller 200 wirelessly, in the memory 470 and refer to the stored information.

The controller 480 may control all the matters related to control of the remote controller 200. The controller 480 may transmit a signal corresponding to manipulation of a designated key of the user input unit 435 or a signal corresponding to movement of the remote controller 200 sensed by the sensor unit 440 to the image display apparatus 100 through the wireless communication unit 425.

The user input interface unit 150 of the image display apparatus 100 may include a wireless communication unit 151 to receive/transmit a signal from/to the remote controller 200 wirelessly, and a coordinate value calculation unit 415 to calculate the coordinate values of the pointer 205 corresponding to operation of the remote controller 200.

The user input interface unit 150 may receive/transmit a signal from/to the remote controller 200 wirelessly through the RF module 412. Further, the user input interface unit 150 may receive a signal transmitted from the remote controller 200 according to an IR communication standard through the IR module 413.

The coordinate value calculation unit 415 may correct hand tremor or an error from a signal corresponding to operation of the remote controller 200, received through the wireless communication unit 151, and calculate the coordinate values (x,y) of the pointer 205 which will be displayed on the display 170.

A signal, transmitted from the remote controller 200 and input to the image display apparatus 100 through the user input interface unit 150, is transmitted to the controller 180 of the image display apparatus 100. The controller 180 may judge information regarding operation and key manipulation of the remote controller 200 from the signal transmitted from the remote controller 200 and correspondingly control the image display apparatus 100.

As another example, the remote controller 200 may calculate the coordinate values of the pointer 205 corresponding to operation of the remote controller 200 and output the coordinate values to the user input interface unit 150 of the image display apparatus 100. In this case, the user input interface unit 150 of the image display apparatus 100 may transmit information regarding the received coordinate values of the pointer 205 to the controller 180 without separate correction of hand tremor or an error.

As yet another example, the coordinate value calculation unit 415 may be provided within the controller 170 not within the user input interface unit 150, differently from FIG. 4B.

Figure 5:
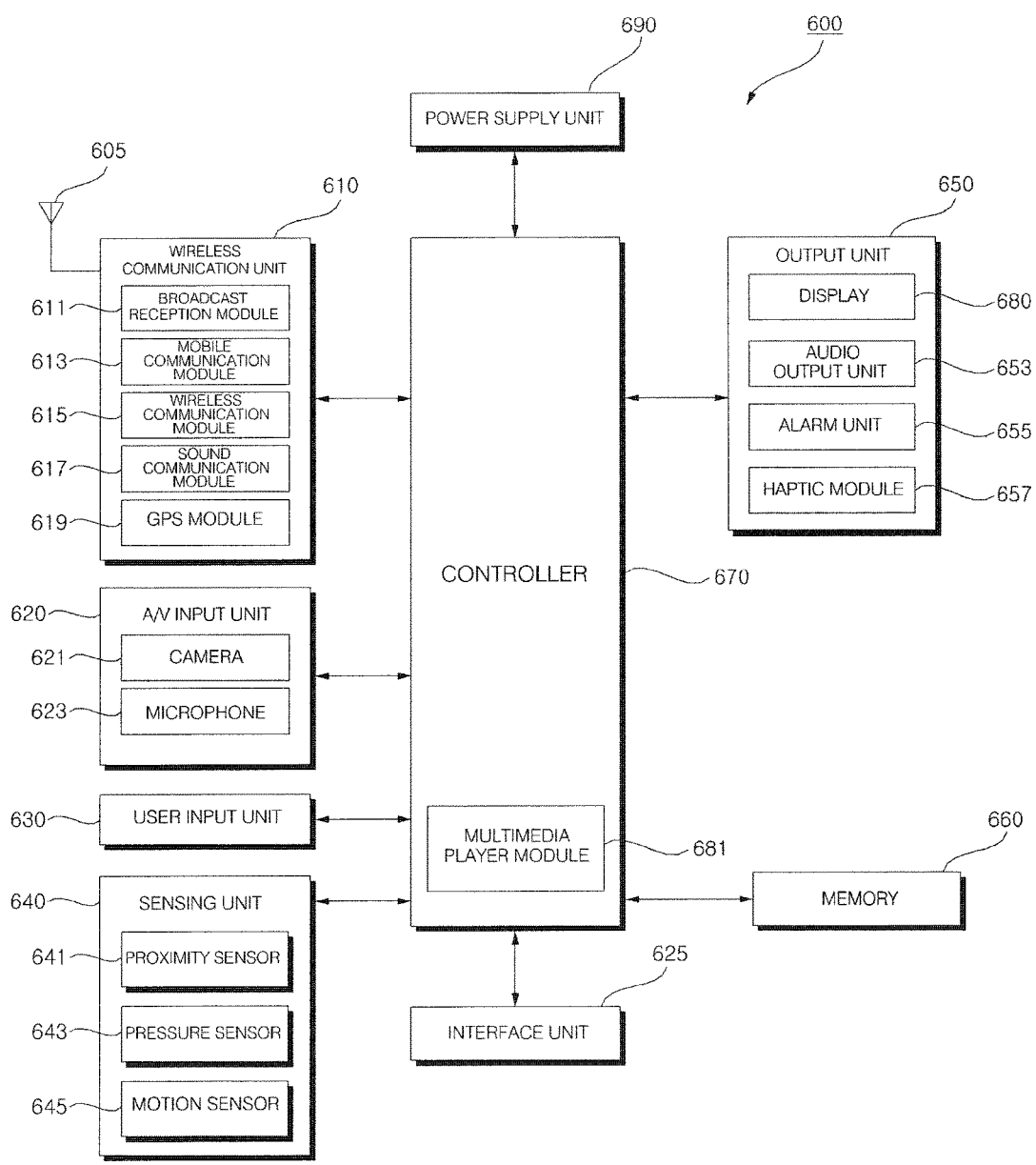
FIG. 5 is an inner block diagram of a mobile terminal of FIG. 1.

FIG. 5 is an inner block diagram of the mobile terminal of FIG. 1.

With reference to FIG. 5, the mobile terminal 600 may include a wireless communication unit 610, an audio/video (A/V) input unit 620, a user input unit 630, a sensing unit 640, an output unit 650, a memory 660, an interface unit 625, a controller 670, and a power supply unit 690.

The wireless communication unit 610 may include a broadcast reception module 611, a mobile communication module 613, a wireless Internet module 615, a sound communication unit 617, and a global positioning system (GPS) module 619.

The broadcast reception module 611 may receive at least one a broadcast signal and broadcast-related information from an external broadcast management server through broadcast channels. Here, the broadcast channels may include satellite broadcast channels, terrestrial broadcast channels, etc.

The broadcast signal and/or broadcast-related information received by the broadcast reception module 611 may be stored in the memory 660.

The mobile communication module 613 receives/transmits a wireless signal from/to at least one of a base station, an external terminal and a server in a mobile communication network. Here, the wireless signal may include a voice call signal, a video call signal, or various types of data according to reception/transmission of text/multimedia messages.

The wireless Internet module 615 means a module for wireless Internet connection and may be installed inside or outside the mobile terminal 600. As one example, the wireless Internet module 615 may perform Wi-Fi-based wireless communication or Wi-Fi Direct-based wireless communication.

The sound communication unit 617 may perform sound communication. The sound communication unit 617 may output sound in a sound communication mode by adding designated information data to audio data, which will be output. Further, the sound communication unit 617 may extract designated data from sound received from the outside in the sound communication mode.

In addition, as near field communication technology, Bluetooth, radio frequency identification (RFID), infrared data association (IrDA), ultra wideband (UWB), ZigBee, etc. may be used.

The GPS module 619 may receive position information from a plurality of GPS satellites.

The A/V input unit 620 serves to input an audio signal or a video signal and may include a camera 621 and a microphone 623.

The user input unit 630 generates key input data, which a user inputs so as to control operation of the mobile terminal 600. For this purpose, the user input unit 630 may include a keypad, a dome switch, or a touch pad (constant-pressure type/capacitive type). Particularly, if a touch pad and the display 680 form a layered structure, such a structure may be referred to as a touchscreen.

The sensing unit 640 may sense the current state of the mobile terminal 600, including the opened/closed state of the mobile terminal 600, the position of the mobile terminal 600 and whether or not a user contacts the mobile terminal 600, and generate a sensing signal to control operation of the mobile terminal 600.

The sensing unit 640 may include a proximity sensor 641, a pressure sensor 643 and a motion sensor 645. The motion sensor 645 may sense the movement or position of the mobile terminal 600 using an acceleration sensor, a gyrosensor, or a gravity sensor. Particularly, the gyrosensor serving to sense an angular velocity may sense a direction (an angle) rotated from a reference direction.

The output unit 650 may include a display 680, an audio output unit 653, an alarm unit 655, and a haptic module 657.

The display 680 displays and outputs information processed by the mobile terminal 600.

Further, if the display 680 and a touch pad form a layered structure to constitute a touchscreen, as described above, the display 680 may be used as an input device, through which information generated by user touch may be input, as well as an output device.

The audio output unit 653 outputs audio data received from the wireless communication unit 610 or stored in the memory 660. The audio output unit 653 may include a speaker, a buzzer, etc.

The alarm unit 655 outputs a signal to inform of generation of an event. As one example, the alarm unit 655 may output a signal as vibration.

The haptic module 657 may generated various haptic effects which a user may feel. As a representative example of the haptic effects generated by the haptic module 657, there is a vibration effect.

The memory 660 may store programs for processing and control by the controller 670, and execute a function of temporarily storing input or output data (for example, a phone book, a message, a still image, a moving picture, etc.).

The interface unit 625 serves as an interface with all external apparatuses connected to the mobile terminal 600. The interface unit 625 may receive data or power from these external apparatuses and transmit the received data or power to the respective elements of the mobile terminal 600, and transmit data within the mobile terminal 600 to external apparatuses.

The controller 670 may control the overall operation of the mobile terminal 600 by controlling the operations of the respective elements. As one example, the controller 670 may perform control and processing regarding voice call, data communication, video call, etc. Further, the controller 670 may include a multimedia player module 681. The multimedia player module 681 may be configured as hardware within the controller 670 or configured as software separately from the controller 670.

The power supply unit 690 receives external power and internal power under the control of the controller 670 and supplies power necessary to operate the respective elements.

FIG. 5 is a block diagram of the mobile terminal 600 in accordance with one embodiment of the present invention. The respective elements of the block diagram may be unified, added or omitted according to specifications of the mobile terminal 600 as substantially implemented. That is, as needed, two or more elements may be unified into one element, or one element may be segmented into two or more elements. Further, functions performed by respective blocks are only to describe the embodiment of the present invention and detailed operations or devices thereof do not limit the scope of the present invention.

Figure 6:
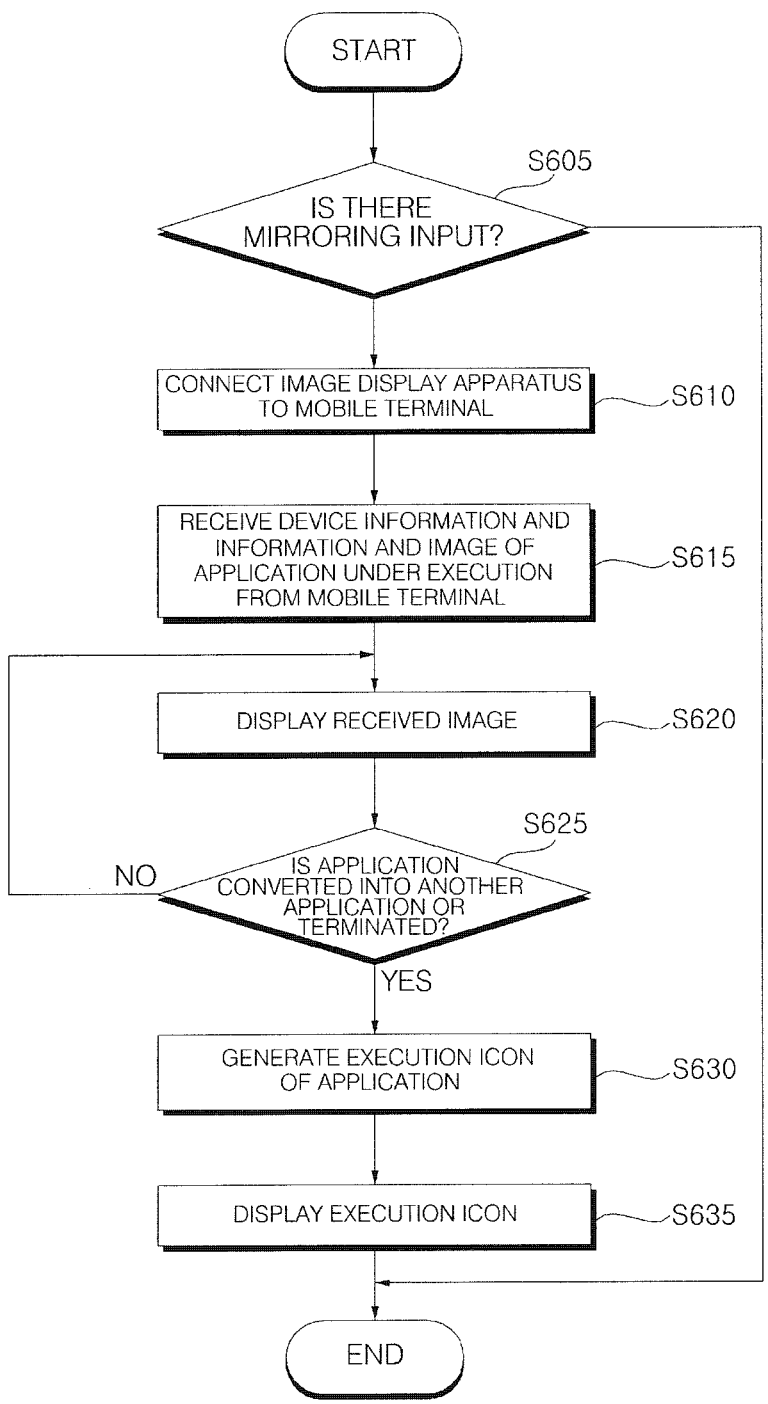
FIG. 6 is a flowchart illustrating a method for operating an image display apparatus in accordance with one embodiment of the present invention.

FIG. 6 is a flowchart illustrating a method for operating an image display apparatus in accordance with one embodiment of the present invention and FIGS. 7A to 10C are reference views to illustrate the method of FIG. 6.

First, with reference to FIG. 6, the image display apparatus 100, if there is a mirroring input, enters a mirroring mode (Operation S605).

As one example, if a mirroring item for mirroring is selected in the image display apparatus 100, the image display apparatus 100 may enter the mirroring mode.

As a further example, if an application, in which mirroring is executable, is selected in the image display apparatus 100, the image display apparatus 100 may enter the mirroring mode.

As another example, if a mirroring folder including an application, in which mirroring is executable, is selected in the image display apparatus 100, the image display apparatus 100 may enter the mirroring mode.

As another example, if a mirroring item for mirroring is selected in the mobile terminal 600, the mobile terminal 600 may enter the mirroring mode.

As another example, if an application, in which mirroring is executable is selected, in the mobile terminal 600, the mobile terminal 600 may enter the mirroring mode.

As yet another example, if a mirroring folder including an application, in which mirroring is executable, is selected in the mobile terminal 600, the mobile terminal 600 may enter the mirroring mode.

Thereafter, according to the mirroring mode, the image display apparatus 100 is connected to the mobile terminal 600 (Operation S610).

As one example, if the image display apparatus 100 enters the mirroring mode by the mirroring input, the image display apparatus 100 may transmit a pairing signal for mirroring to the mobile terminal 600 through the external device interface unit 130. Then, the mobile terminal 600 may transmit a pairing response signal to the image display apparatus 100. The image display apparatus 100 and the mobile terminal 600 may be connected to each other based on the pairing signal and the pairing response signal.

As another example, if the mobile terminal 600 enters the mirroring mode by the mirroring input, the mobile terminal 600 may transmit a pairing signal for mirroring to the image display apparatus 100. Then, the image display apparatus 100 may transmit a pairing response signal to the mobile terminal 600 through the external device interface unit 130. The image display apparatus 100 and the mobile terminal 600 may be connected to each other based on the pairing signal and the pairing response signal.

Thereafter, the external device interface unit 130 of the image display apparatus 100 may receive device information including a device ID, information of an application under execution, and an image of the application under execution from the mobile terminal 600 (Operation S615).

Particularly, the external device interface unit 130 of the image display apparatus 100 may receive an image of the application under execution from the mobile terminal 600 after reception of device information including the device ID and information of the application under execution from the mobile terminal 600.

The application information may include an application ID, application version information and an application icon image. The application information together with the device information may be stored in the memory 140.

The controller 170 of the image display apparatus 100 may perform authentication of the mobile terminal 600 based on the device information including the device ID.

Further, the controller 170 of the image display apparatus 100 may acquire information of the application under execution based on the application information.

The controller 170 of the image display apparatus 100 may display an application execution image received from the mobile terminal 600 (Operation S620).

Particularly, the controller 170 of the image display apparatus 100 may scale the application execution image received from the mobile terminal 600 and display the scaled application execution image on the display 180. Thereby, a user may view an enlarged application execution image.

Thereafter, the controller 170 of the image display apparatus 100 judges whether or not the application under execution in the mobile terminal 600 is converted into another application or terminated (Operation S625) and, upon judging that the application under execution in the mobile terminal 600 is converted into another application or terminated, generates an execution icon of the application (Operation S630). Then, the controller 170 of the image display apparatus 100 displays the generated execution icon on the display 180 (Operation S635).

The mobile terminal 600 in the mirroring mode, if execution of the application under execution is terminated or a home button is operated to return the mobile terminal 600 to a home screen, may transmit execution termination information of the corresponding application to the image display apparatus 100.

As one example, if the mobile terminal 600 returns to the home screen, the mobile terminal 600, the mobile terminal 600 may transmit mirroring mode termination information to the image display apparatus 100, in addition to the application termination information.

As another example, if a second application, in which mirroring is executable, is executed in the mobile terminal 600 during execution of the first application, the mobile terminal 600 may transmit first application execution termination information to the image display apparatus 100. Here, since mirroring continues to be executed, mirroring mode termination information may not be transmitted to the image display apparatus 100.

The controller 170 of the image display apparatus 100 may judge whether or not the corresponding application is terminated based on the received application image through mirroring.

As one example, if the image of another application, in which mirroring is executable, is received, the controller 170 of the image display apparatus 100 may judge that the former application is terminated through an image recognition algorithm.

As another example, if the image of a designated application regarding mirroring is not received any more, the controller 170 of the image display apparatus 100 may judge that the mirroring mode is terminated.

If reception of the image of the application under execution is terminated, i.e., if the corresponding application is terminated or converted into another application, the controller 170 of the image display apparatus 100 may generate an execution icon of the corresponding application using the application information stored in the memory 140.

In more detail, the controller 170 of the image display apparatus 100 may generate the execution icon of the corresponding application using an application icon image out of the application information. Further, the controller 170 of the image display apparatus 100 may include the execution icon of the corresponding application within an application list.

If there is application list display input, the controller 170 of the image display apparatus 100 may display the application list including the generated execution icon.

The image display apparatus 100 may generate and display an execution icon regarding the mirroring mode and thus user convenience may be increased.

Particularly, if an execution icon is selected in a state in which the mirroring mode is terminated, the image display apparatus 100 may transmit information regarding a corresponding application to the mobile terminal 600 so as to enter the mirroring mode. Thereby, mirroring may be conveniently executed through the image display apparatus 100.

Further, an execution icon may be executed based on the device information as well as the application information. Thereby, different execution icons according to a plurality of mobile terminals or users may be generated and displayed.

When an application list is displayed, the controller 170 of the image display apparatus 100 may display an application list including an execution icon corresponding to user information or mobile terminal information according to the user information or mobile terminal information.

The controller 170 of the image display apparatus 100, if first user information or mobile terminal information is input, may display a first application list including a first execution icon corresponding to the first user information, the mobile terminal, or a first mobile terminal used by the first user.

The controller 170 of the image display apparatus 100, if second user information or mobile terminal information is input, may display a second application list including a second execution icon corresponding to the second user information, the mobile terminal, or a second mobile terminal used by the second user.

Thereby, user-customized execution icons may be provided and thus user convenience may be increased.

The controller 170 of the image display apparatus 100 judges whether or not there is execution icon selection input in the displayed state of the generated execution icon (Operation S770). The controller 170 of the image display apparatus 100, in response to selection of the execution icon, displays an application image corresponding to the execution icon (Operation S785).

As one example, according to application list display unit, the controller 170 of the image display apparatus 100 may display an execution icon for mirroring in the application list while displaying the application list.

The controller 170 of the image display apparatus 100, if the execution icon in the application list is selected based on input of a direction key of the remote controller or the pointer, may execute an application corresponding to the execution icon.

As one example, the controller 170 of the image display apparatus 100, if a gallery application corresponds to the execution icon, may transmit related information to the mobile terminal 600 so as to execute the gallery application. Thereby, the mobile terminal 600 executes the gallery application and transmits a displayed gallery application image to the image display apparatus 100.

Then, the controller 170 of the image display apparatus 100 may display the received gallery application image via signal processing, such as scaling.

The controller 170 of the image display apparatus 100, if the execution icon in the application list is selected based on input of the direction key of the remote controller or the pointer, may execute both the gallery application corresponding to the execution icon and an SNS application, receive both a gallery application image and an SNS application image from the mobile terminal 600, and display both the gallery application image and the SNS application image.

Here, the execution icon in the application list may include a mirroring folder or a mirroring icon according to users or mobile terminals.

If a mirroring folder or a mirroring icon according to users or mobile terminals is selected, a gallery application image included in the mirroring folder or the mirroring icon according to users or mobile terminals and an SNS application image may be displayed as mirroring images.

Differently, if a gallery application item and an SNS application item are displayed through selection of the mirroring folder or the mirroring icon according to users or mobile terminals, a gallery application image may be displayed as a mirroring image.

Hereinafter, the method of FIG. 6 will be described with reference to FIGS. 7A to 100.

Figure 7A:
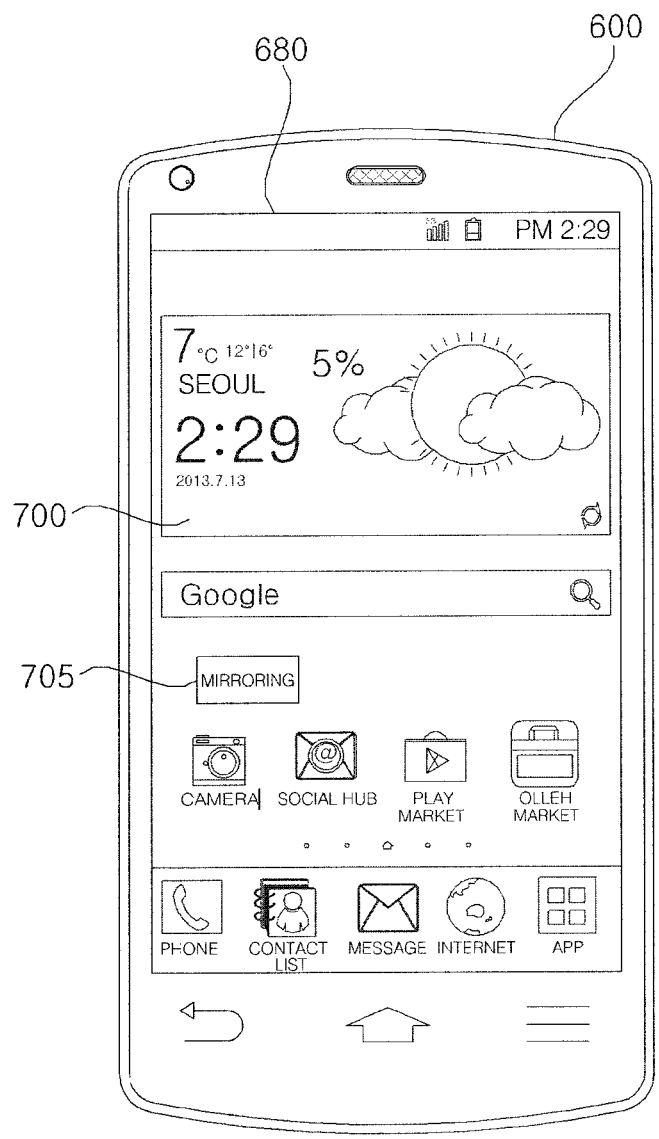
FIGS. 7A to 10C are reference views to illustrate the method of FIG. 6.

FIG. 7A is a view exemplarily illustrating a home screen 700 on the display 680 of the mobile terminal 600. The home screen 700 may include a mirroring folder or icon 705.

Figure 7B:
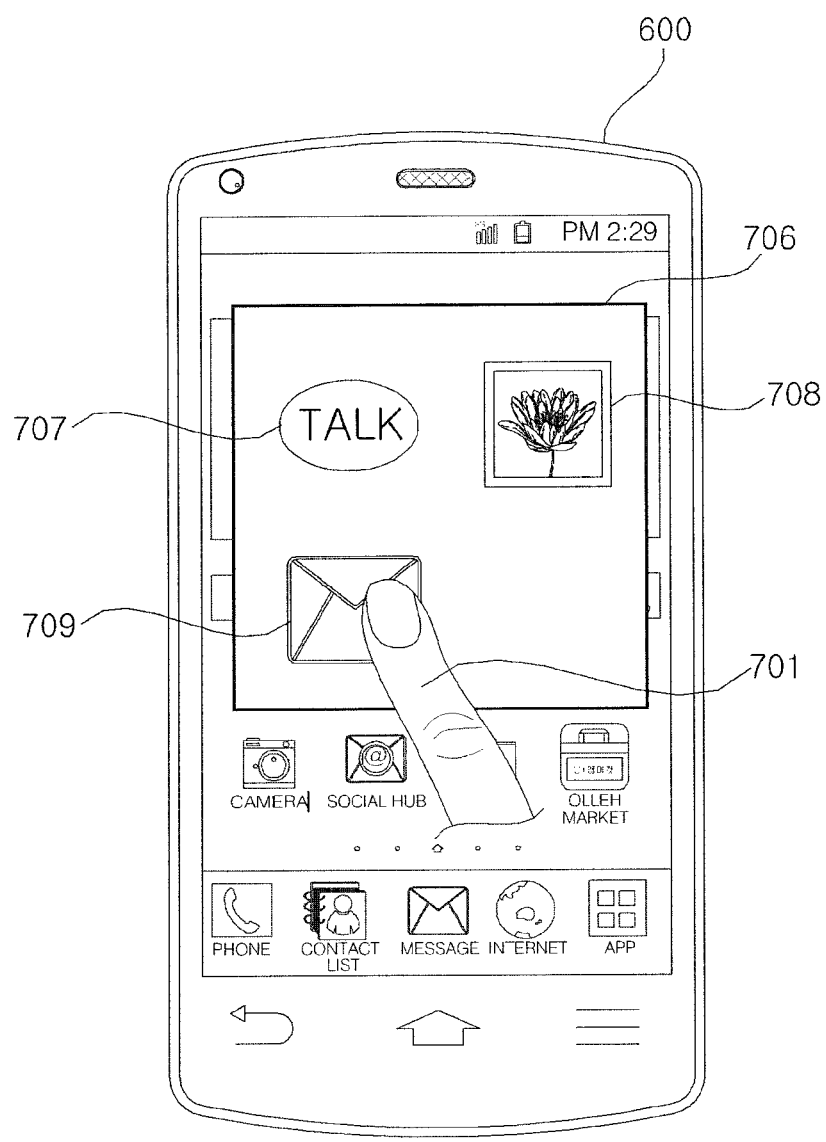

If the mirroring folder or icon 705 is selected, the controller 670 of the mobile terminal 600 may display an application list 706 including application items 707, 708 and 709, in which mirroring is executable, as exemplarily shown in FIG. 7B.

FIG. 7B exemplarily illustrates that a mail application item 709 is selected from the application list 706 including the application items 707, 708 and 709, in which mirroring is executable, by a user finger 701.

Figure 7C:
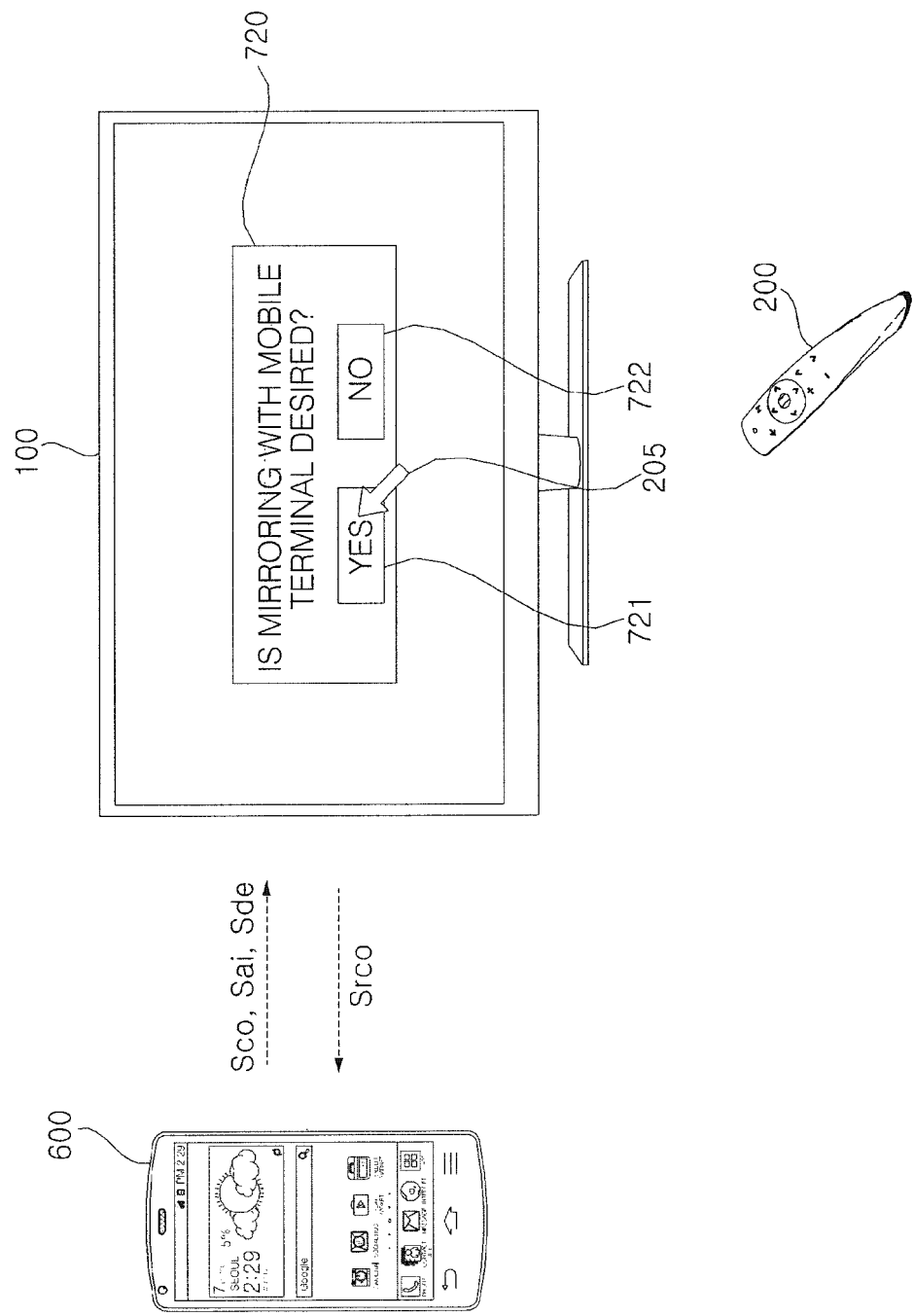

If the mirroring folder or icon 705 is selected, the mobile terminal 600 may transmit a pairing request signal (Sco) to the image display apparatus 100, as exemplarily shown in FIG. 7C.

The controller 170 of the image display apparatus 100 may display an object 720 indicating whether or not the image display apparatus 100 enters the mirroring mode, based on the pairing request signal (Sco) received through the external device interface unit 130.

The object 720 indicating whether or not the image display apparatus 100 enters the mirroring mode may have an acceptance item 721 and a rejection item 722.

The user input interface unit 150 of the image display apparatus 100 may receive a pointing signal from the remote controller 200. The controller 170 of the image display apparatus 100 may display the pointer 205 based on the pointing signal.

If the acceptance item 721 is selected by the pointer 205, the image display apparatus 100 may enter the mirroring mode.

Thereby, the image display apparatus 100 may transmit a pairing response signal (Srco) to the mobile terminal. Thereby, the mobile terminal 600 and the image display apparatus 100 may be connected for mirroring.

If the mail application item 709 is selected, the mobile terminal 600 may transmit application information (Sai) corresponding to a mail application and device information (Sde) of the mobile terminal 600 to the image display apparatus 100, as exemplarily shown in FIG. 7C.

The controller 170 of the image display apparatus 100 may store the application information (Sai) and the device information (Sde) of the mobile terminal 600, received through the external device interface unit 130, in the memory 140.

Figure 7D:
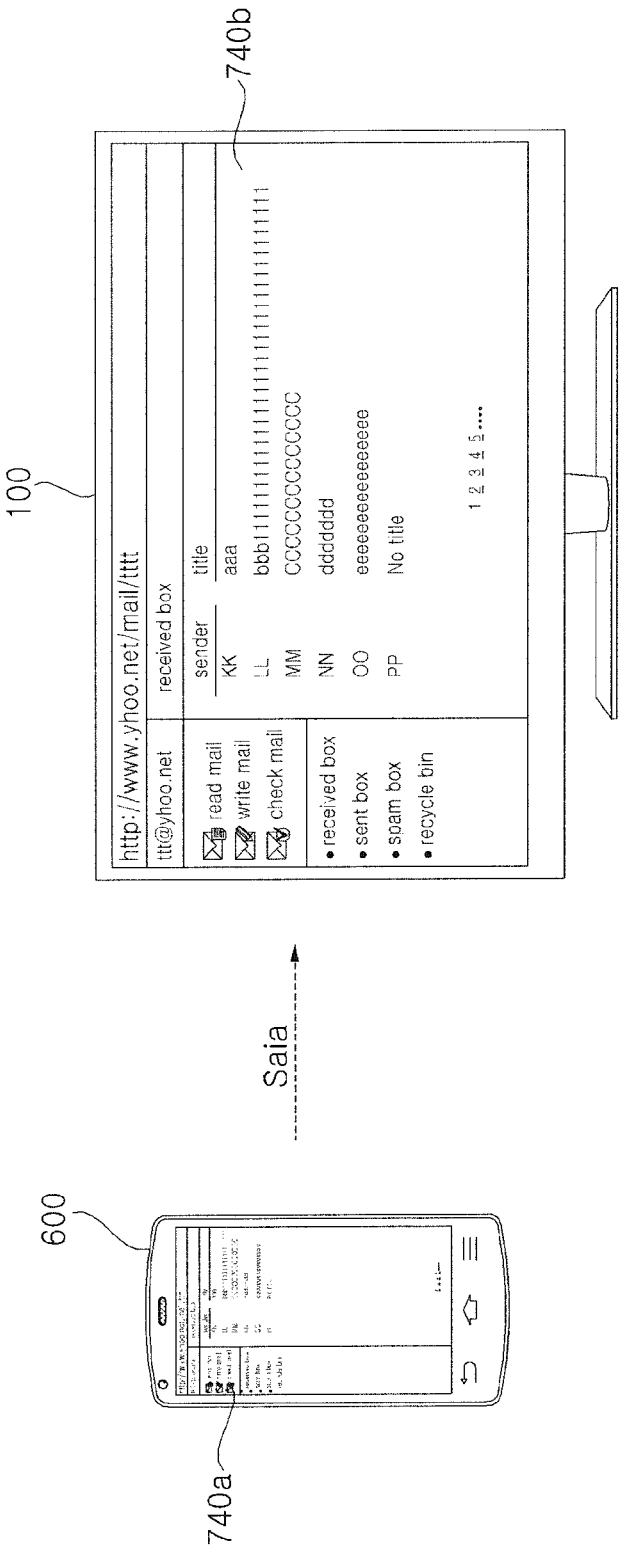

FIG. 7D exemplarily illustrates that a mail image 740a corresponding to the mail application executed by the mobile terminal 600 is displayed on the mobile terminal 600, an application image (Saia) is transmitted to the image display apparatus 100 by mirroring, and an enlarged application image 740b is displayed as a mirroring image on the image display apparatus 100.

Figure 7E:
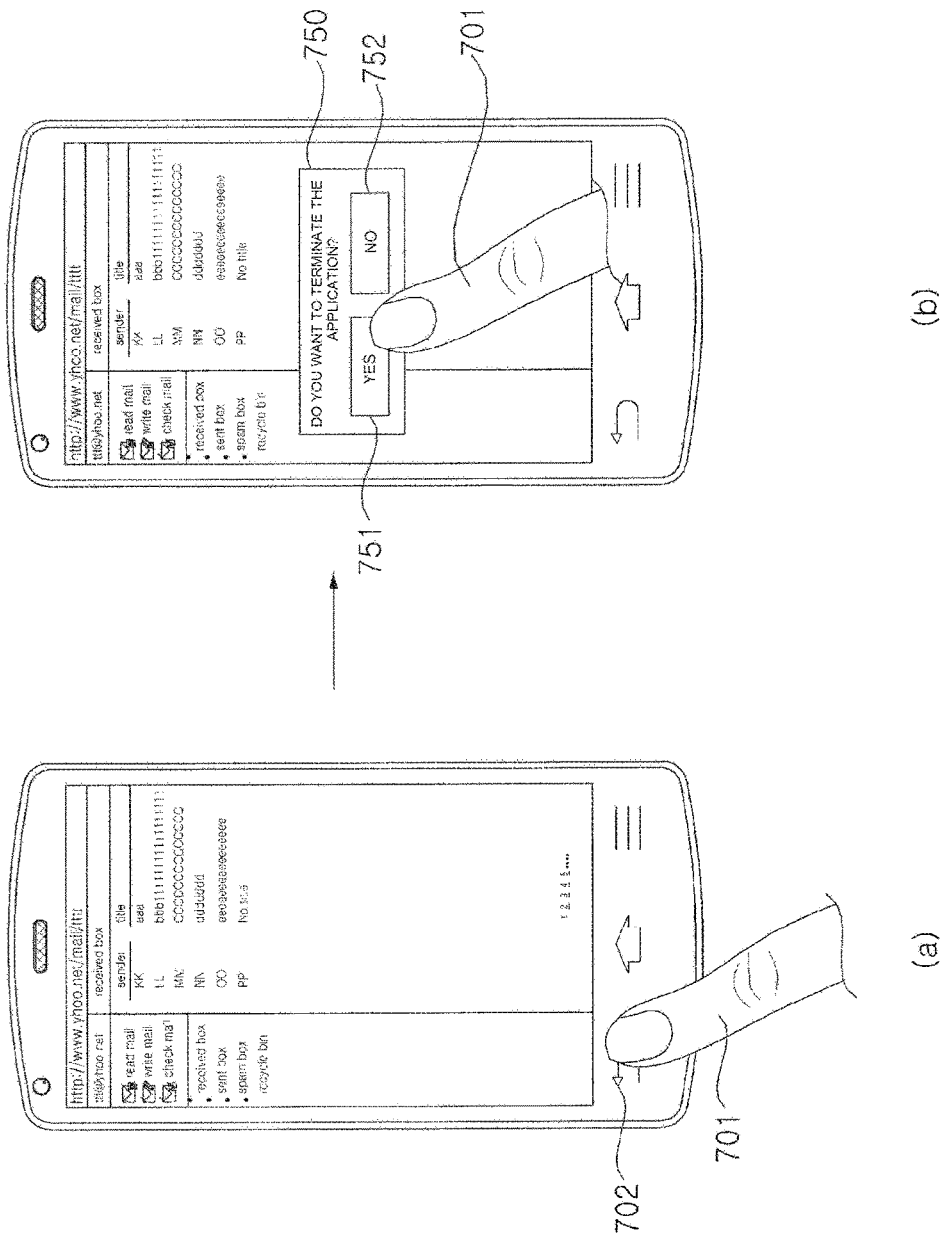

Thereafter, FIG. 7E exemplarily illustrates that a back key 702 is selected by the user finger 701 in the mobile terminal 600. Thereby, an object 750 indicating whether or not the application is terminated may be displayed.

The object 750 may have an acceptance item 751 and a rejection item 752. If the acceptance item 751 is selected by the user finger 701, the mail application executed in the mobile terminal 600 is terminated.

FIG. 7F exemplarily illustrates that the home screen 700 is displayed on the mobile terminal 600 and application termination information (Sael) is transmitted to the image display apparatus 100, by termination of the mail application.

The controller 170 of the image display apparatus 100 may display an object 760 indicating whether or not an execution icon of the application, execution of which has been terminated, is generated based on the application termination information (Sael).

The object 760 may include an icon indicating the mail application and indicate whether or not the mail application is registered as an execution icon.

If an acceptance item 761 of the object 760 is selected by the pointer 205, the controller 170 of the image display apparatus 100 may generate an execution icon corresponding to the mail application.

Differently from the drawings, the controller 170 of the image display apparatus 100 may automatically generate an execution icon corresponding to the mail application without display of the object 760, after reception of the application termination information (Sael).

Figure 7G:
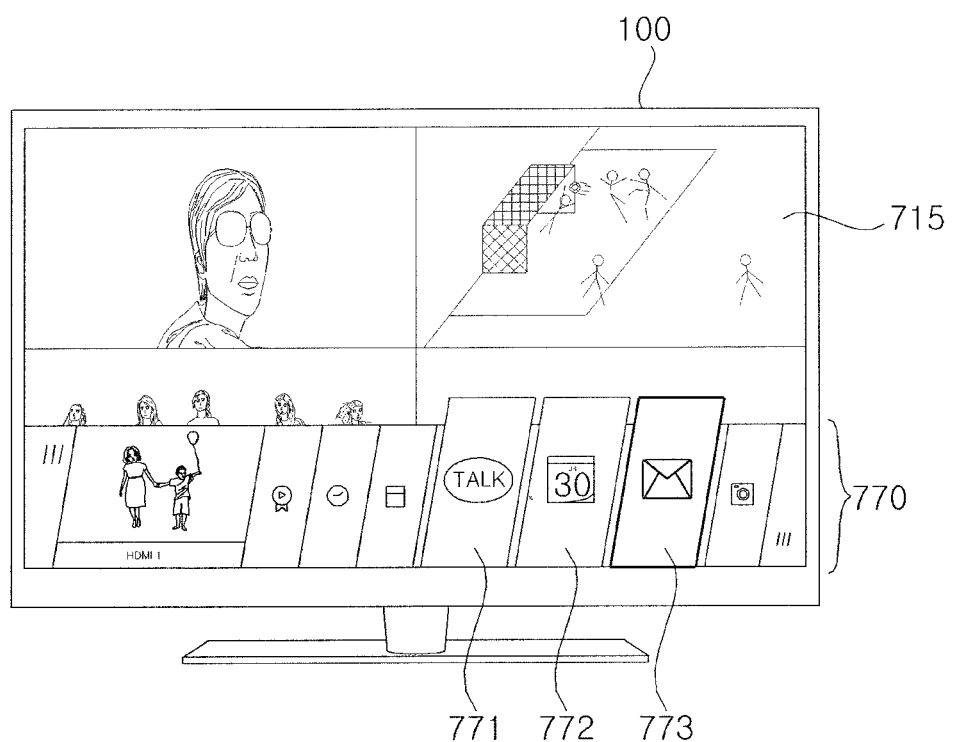

The controller 170 of the image display apparatus 100, if a designated key 201 of the remote controller 200 is operated, as exemplarily shown in FIG. 7G, may display a designated image 715 and an application list 770 including a generated execution icon 773. Here, the designated image 715 may be a broadcast image based on a broadcast signal received by the broadcast reception unit 105.

Differently from the drawings, the controller 170 of the image display apparatus 100 may automatically display the application list 770 including the generated execution icon 773, immediately after generation of the execution icon 773.

The controller 170 of the image display apparatus 100 may display execution icons 771 and 772, previously executed through mirroring, together with the most recently execution icon 773 within the application list 770.

Particularly, the controller 170 of the image display apparatus 100 may align a plurality of execution icons 771, 772 and 773 corresponding to a plurality of applications in the order of reception from the mobile terminal 600 or the order of execution by the mobile terminal 600.

That is, an execution icon 771 corresponding to a messenger application, an execution icon 772 corresponding to a scheduler application and the execution icon 773 corresponding to the mail application may be sequentially aligned and displayed in the order of execution. Particularly, the most recently generated execution icon 773 may be highlighted differently from other icons.

The controller 170 of the image display apparatus 100, if user information, such as login information, or mobile terminal information is input, may display an application list including an execution icon corresponding to a user.

That is, if first user information or mobile terminal information is input, the controller 170 of the image display device 100 may display a first application list including a first execution icon in which mirroring in the first mobile terminal of the first user was executed.

Otherwise, if a second user information or mobile terminal information is input, the controller 170 of the image display device 100 may display a second application list including a second execution icon in which mirroring in the second mobile terminal of the second user was executed.

Further, the controller 170 of the image display apparatus 100 may display an application list including the first execution icon in which mirroring in the first mobile terminal was executed and the second execution icon in which mirroring in the second mobile terminal was executed.

If an application list including execution icons for a plurality of users is displayed in such a manner, in order to prevent execution of an application by selection of an execution icon by other users without permission, the controller 170 of the image display apparatus 100, when an execution icon is selected, may display an input window to input authentication information, such as a password.

Figure 8A:
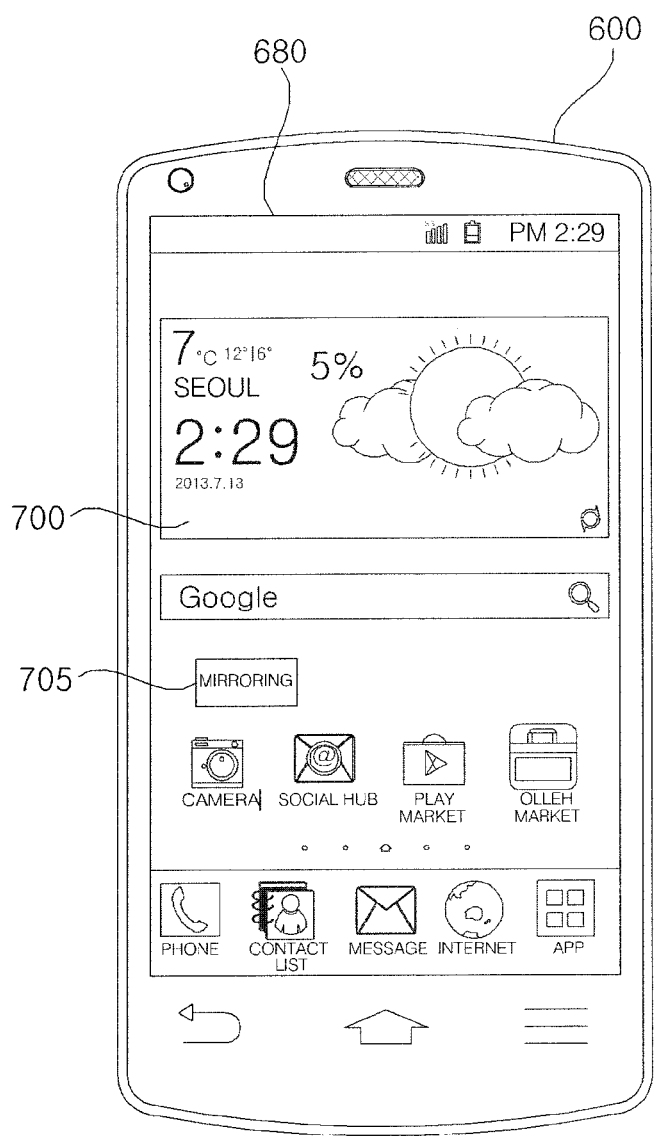

In the same manner as FIG. 7A, FIG. 8A is a view exemplarily illustrating a home screen 700 on the display 680 of the mobile terminal 600. The home screen 700 may include the mirroring folder or icon 705.

Figure 8B:
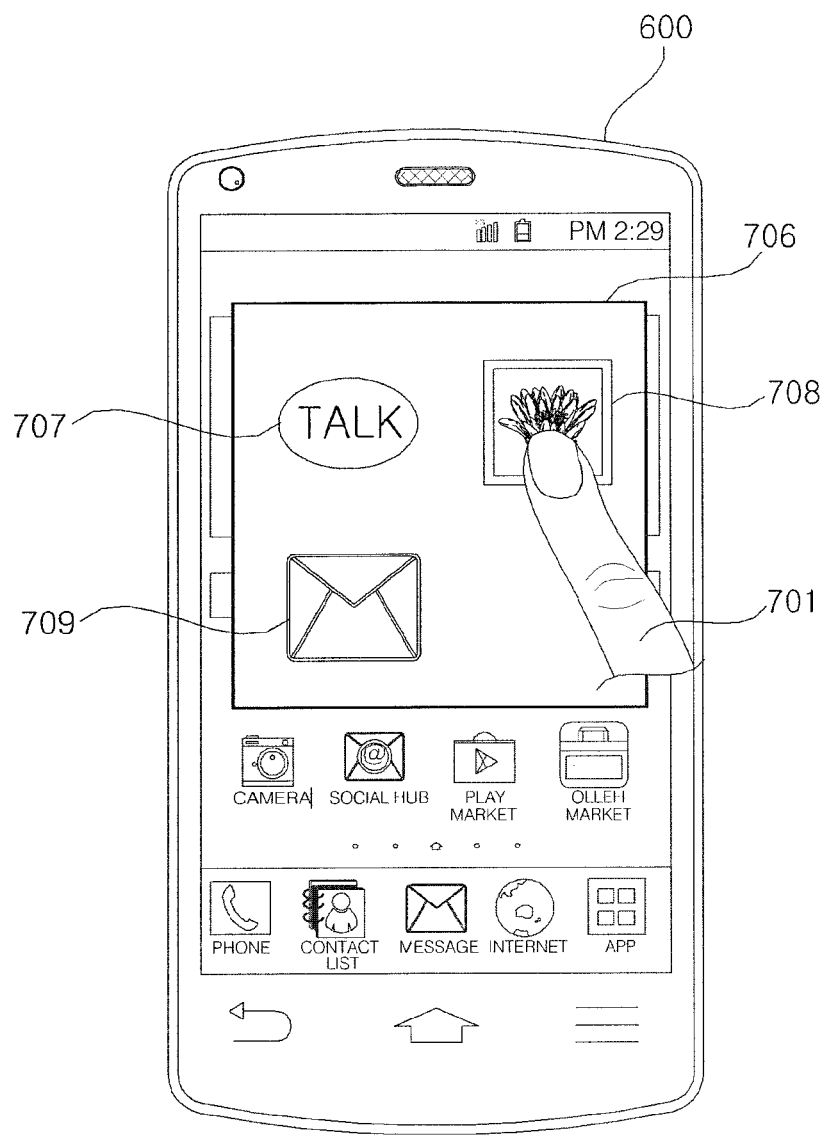

If the mirroring folder or icon 705 is selected, the controller 670 of the mobile terminal 600 may display the application list 706 including the application items 707, 708 and 709, in which mirroring is executable, as exemplarily shown in FIG. 8B.

FIG. 8B exemplarily illustrates that the gallery application item 708 is selected from the application list 706 including the application items 707, 708 and 709, in which mirroring is executable, by the user finger 701.

If the mirroring folder or icon 705 is selected, the mobile terminal 600 may transmit a pairing request signal (Sco) to the image display apparatus 100 and the image display apparatus 100 may transmit a pairing response signal (Srco) to the mobile terminal 600, as exemplarily shown in FIG. 8C.

If the gallery application item 708 is selected, the mobile terminal 600 may transmit application information (Sai) corresponding to a gallery application and device information (Sde) of the mobile terminal 600 to the image display apparatus 100, as exemplarily shown in FIG. 8C.

The controller 170 of the image display apparatus 100 may store the application information (Sai) and the device information (Sde) of the mobile terminal 600, received through the external device interface unit 130, in the memory 140.

Figure 8D:
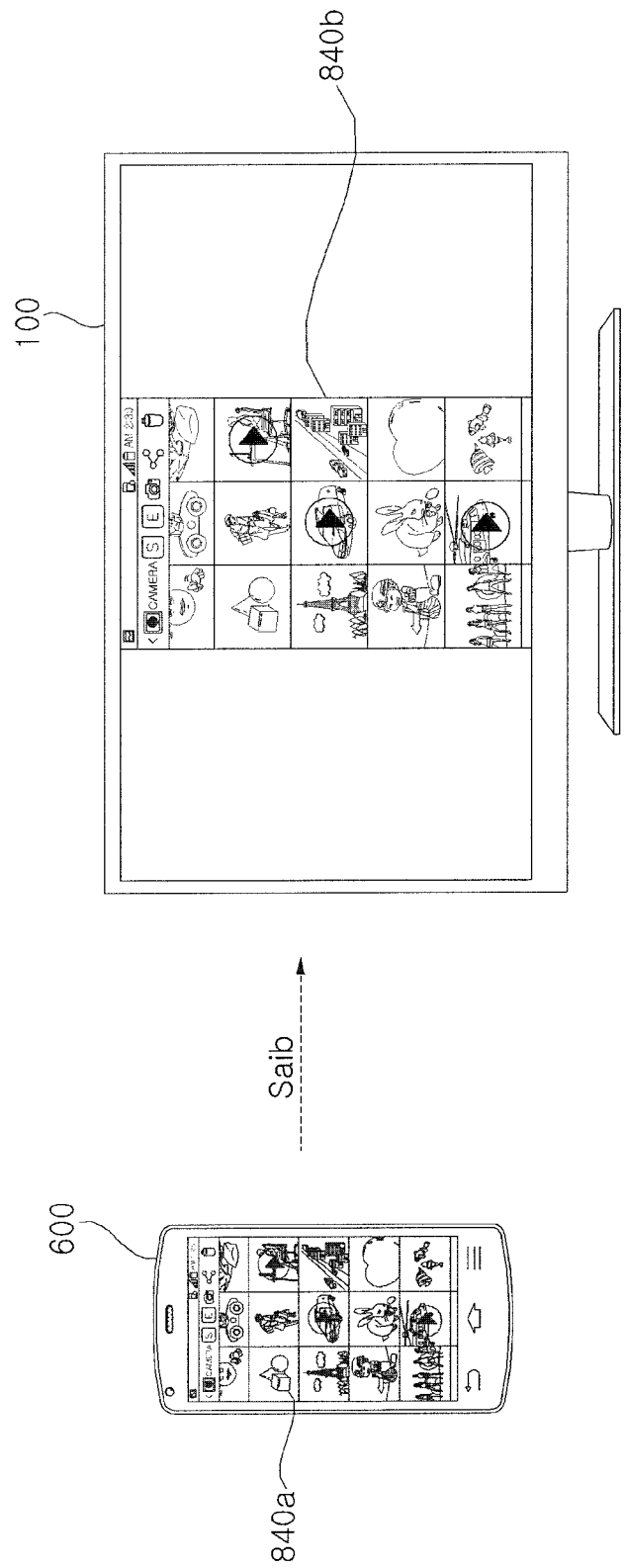

FIG. 8D exemplarily illustrates that a gallery image 840a corresponding to the gallery application executed by the mobile terminal 600 is displayed on the mobile terminal 600, an application image (Saib) is transmitted to the image display apparatus 100 by mirroring, and an enlarged application image 840b is displayed as a mirroring image on the image display apparatus 100.

Figure 8E:
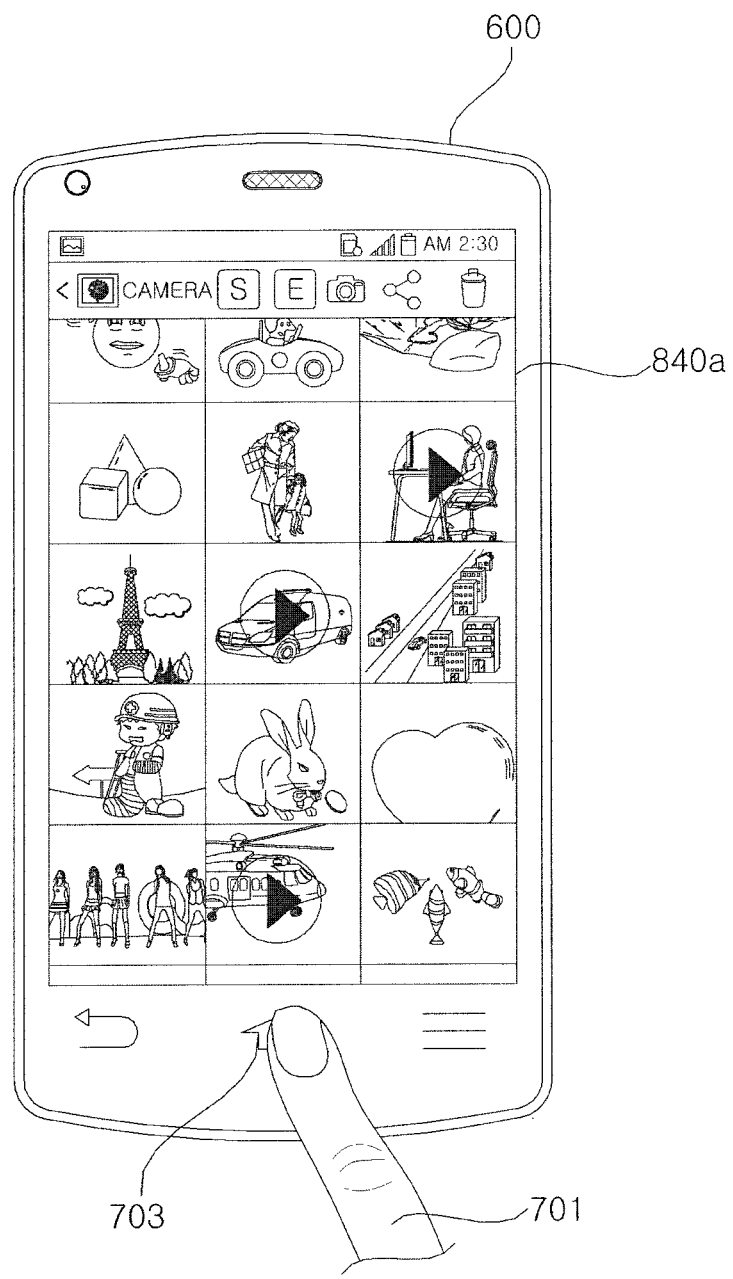
Figure 8F:
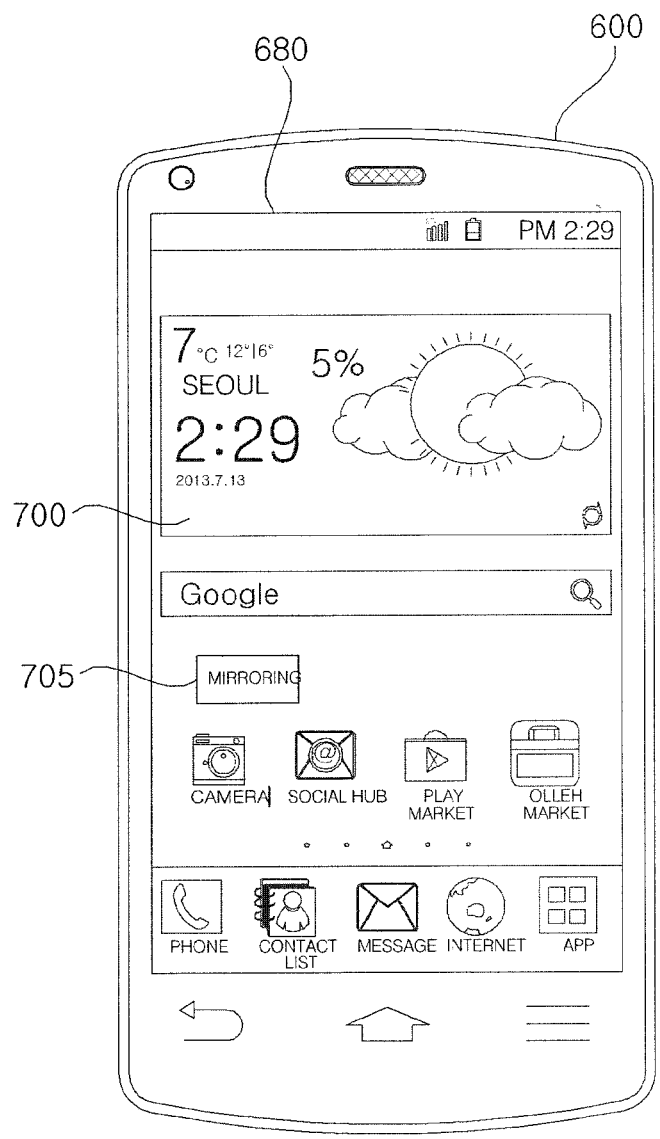

Thereafter, FIG. 8E exemplarily illustrates that a home key 703 is selected by the user finger 701 in the mobile terminal 600. Thereby, the home screen 700 may be displayed, as exemplarily shown in FIG. 8F.

Figure 8G:
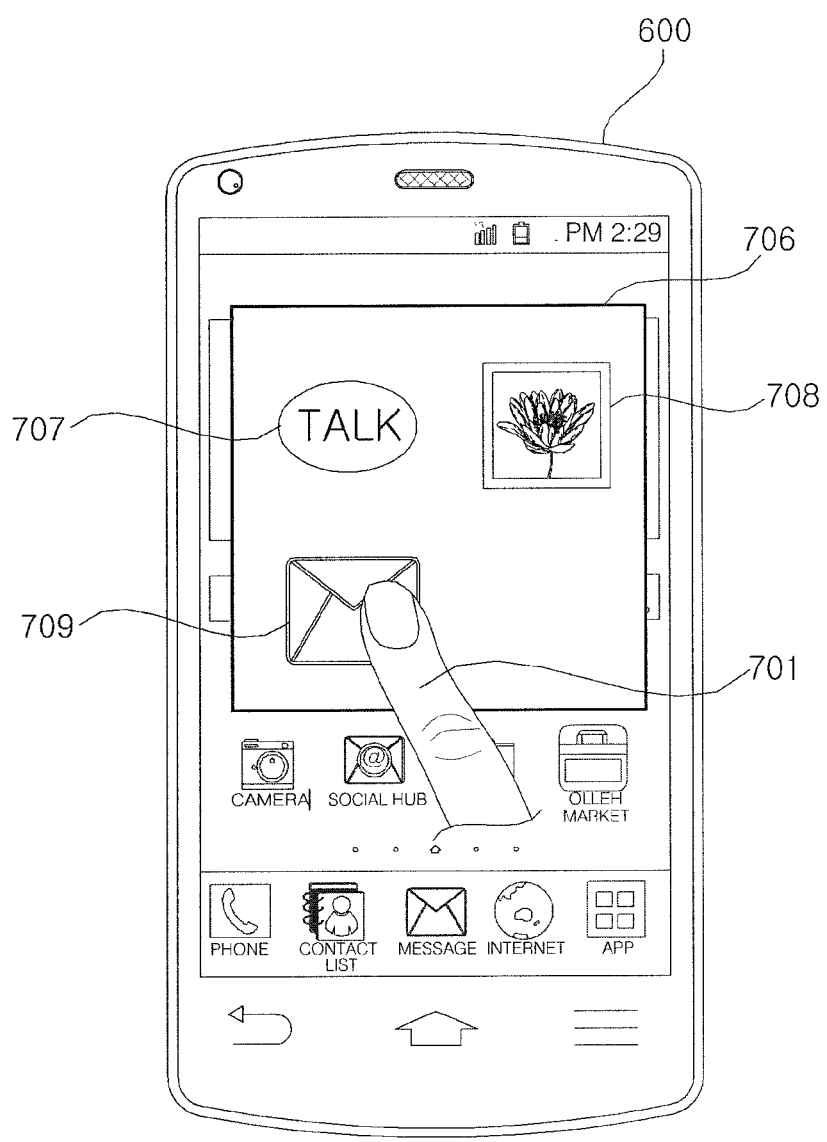
Figure 8I:
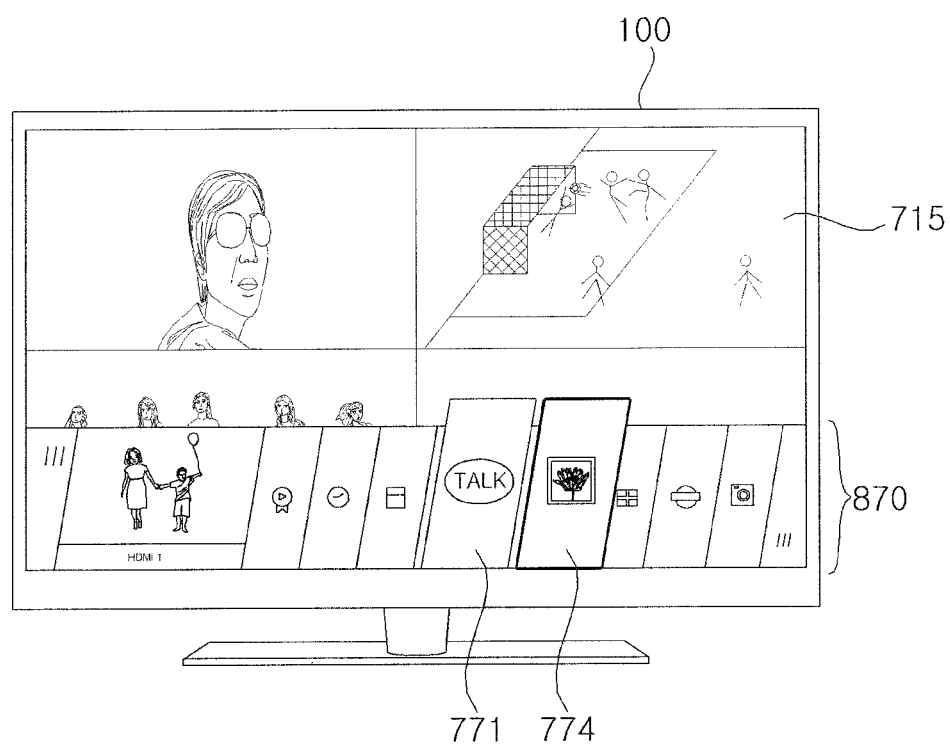
Figure 8I:
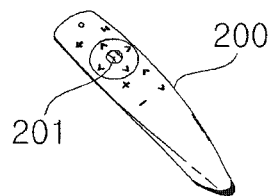

Here, if the mirroring folder or icon 705 is selected again, the application list 706 including the application items 707, 708 and 709, in which mirroring is executable, may be displayed, as exemplarily shown in FIG. 8G.

If the mail application item 709 is selected, the mail application may be executed, a mail application image (Saia) may be transmitted to the image display apparatus 100 by mirroring, and an enlarged mail application image 740*b* is displayed as a mirroring image on the image display apparatus 100, as exemplarily shown in FIG. 7D.

If the application under execution is converted into another application and thus the latter application is executed, the mobile terminal 600 may transmit gallery application termination information (Sael) to the image display apparatus 100, as exemplarily shown in FIG. 8H.

The controller 170 of the image display apparatus 100 may display an object 860 indicating whether or not an execution icon of the terminated application is generated based on the gallery application termination information (Sael).

The object 860 may include an icon indicating the gallery application and indicate whether or not the gallery application is registered as an execution icon.

If an acceptance item 861 of the object 860 is selected by the pointer 205, the controller 170 of the image display apparatus 100 may generate an execution icon corresponding to the gallery application.

Differently from the drawings, the controller 170 of the image display apparatus 100 may automatically generate an execution icon corresponding to the gallery application without display of the object 860, after reception of the gallery application termination information (Sael).

The controller 170 of the image display apparatus 100, if a designated key 201 of the remote controller 200 is operated, as exemplarily shown in FIG. 8J, may display a designated image 715 and an application list 870 including a generated execution icon 774.

Differently from the drawings, the controller 170 of the image display apparatus 100 may automatically display the application list 870 including the generated execution icon 774, immediately after generation of the execution icon 774.

The controller 170 of the image display apparatus 100 may display the execution icon 773, previously executed through mirroring, together with the most recently execution icon 774 within the application list 870.

Further, the controller 170 of the image display apparatus 100 may display an application list including execution icons corresponding to applications executed by a plurality of mobile terminals. This will be described with reference to FIGS. 9A to 9C.

Figure 9A:
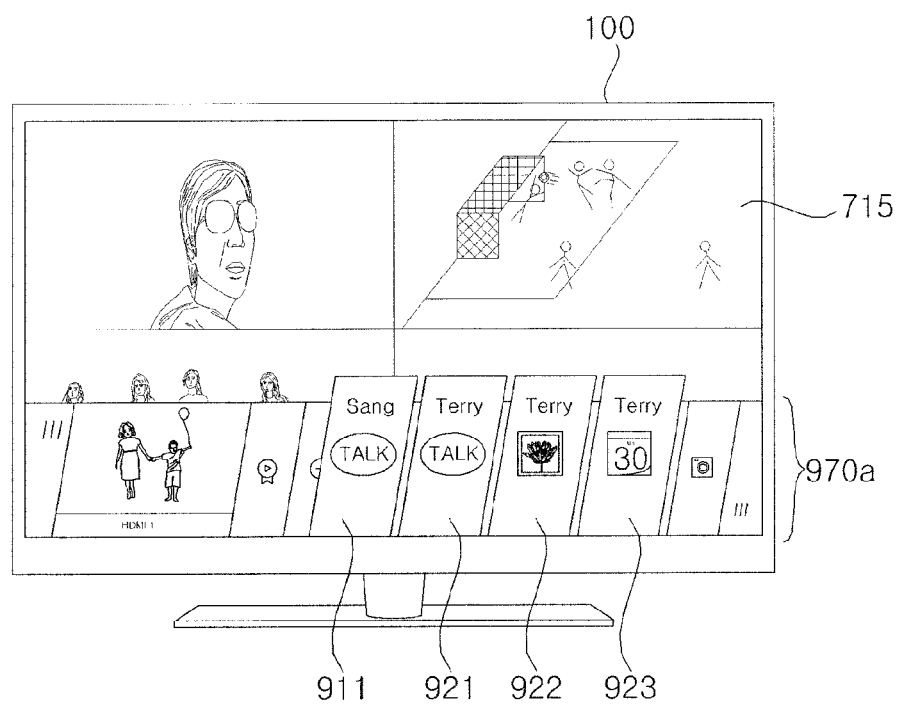

FIG. 9A exemplarily illustrates that a designated image 715 and an application list 970*a* are displayed.

The application list 970*a* may include execution icons 921, 922 and 923, executed by a first mobile terminal 600*a* of a first user (Terry), and an execution icon 911, executed by a second mobile terminal 600*b* of a second user (Sang).

As one example, the controller 170 of the image display apparatus 100, if a designated key 201 of the remote controller 200 is operated, may display the application list 970*a* including the execution icons 921, 922 and 923 corresponding to applications executed by the first mobile terminal 600*a* of the first user (Terry) and the execution icon 911 corresponding to an application executed by the second mobile terminal 600*b* of the second user (Sang).

Figure 9B:
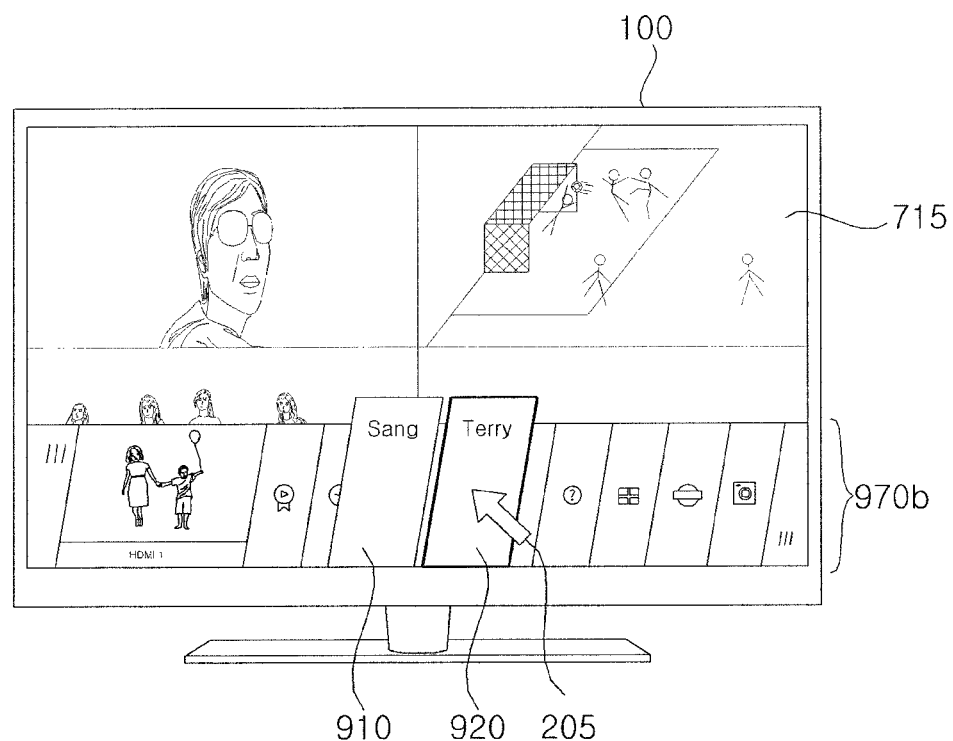
Figure 9B:
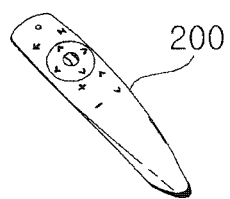

FIG. 9B exemplarily illustrates that a designated image 715 and an application list 970*b* are displayed.

The application list 970*b* may include a first user (Terry) icon 920 and a second user (Sang) icon 910.

Figure 9C:
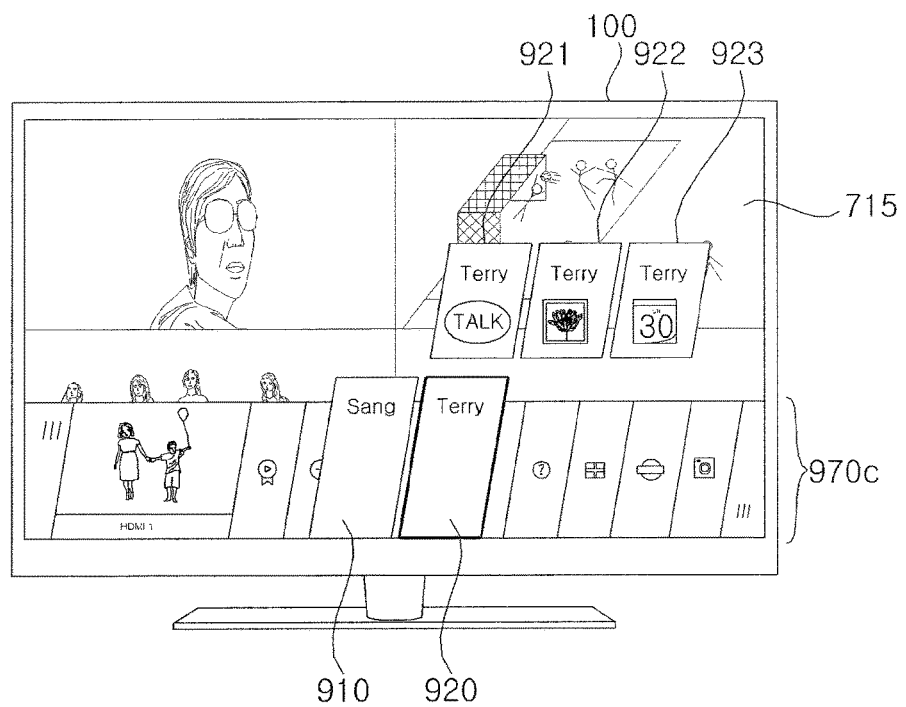

The controller 170 of the image display apparatus 100, if the first user (Terry) icon 920 is selected by the pointer 205, may display the execution icons 921, 922 and 923 executed by the first mobile terminal 600*a*, included in the first user (Terry) icon 920, as exemplarily shown in FIG. 9C.

The controller 170 of the image display apparatus 100, when the intensity of a wireless signal received from the mobile terminal 600 is a designated intensity or more, may automatically display an application list including execution icons.

The controller 170 of the image display apparatus 100 may automatically display an application list including first execution icons corresponding to the first mobile terminal 600*a*, when the intensity of a wireless signal received from the first mobile terminal 600*a* is a designated intensity or more, and may automatically display an application list including the first execution icons and second execution icons corresponding to the second mobile terminal 600*b*, when the intensity of a wireless signal received from the second mobile terminal 600*b* is a designated intensity or more under the condition that the application list including the first execution icons is displayed. This will be described with reference to FIGS. 10A to 10C.

Figure 10A:
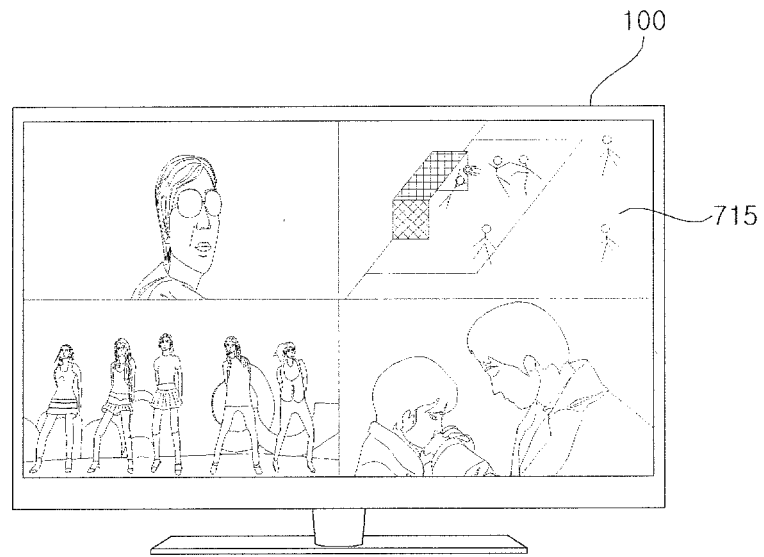
Figure 10A:
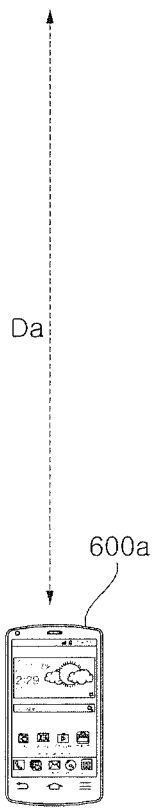

FIG. 10A exemplarily illustrates that a distance between the image display apparatus 100 and the first mobile terminal 600*a* is a considerably long distance Da.

The controller 170 of the image display apparatus 100, if the distance between the image display apparatus 100 and the first mobile terminal 600*a* is a considerably long distance Da and thus the intensity of a wireless signal received from the first mobile terminal 600*a* is less than a designated intensity, may display the image 715 as is without execution of a specific operation.

Figure 10B:
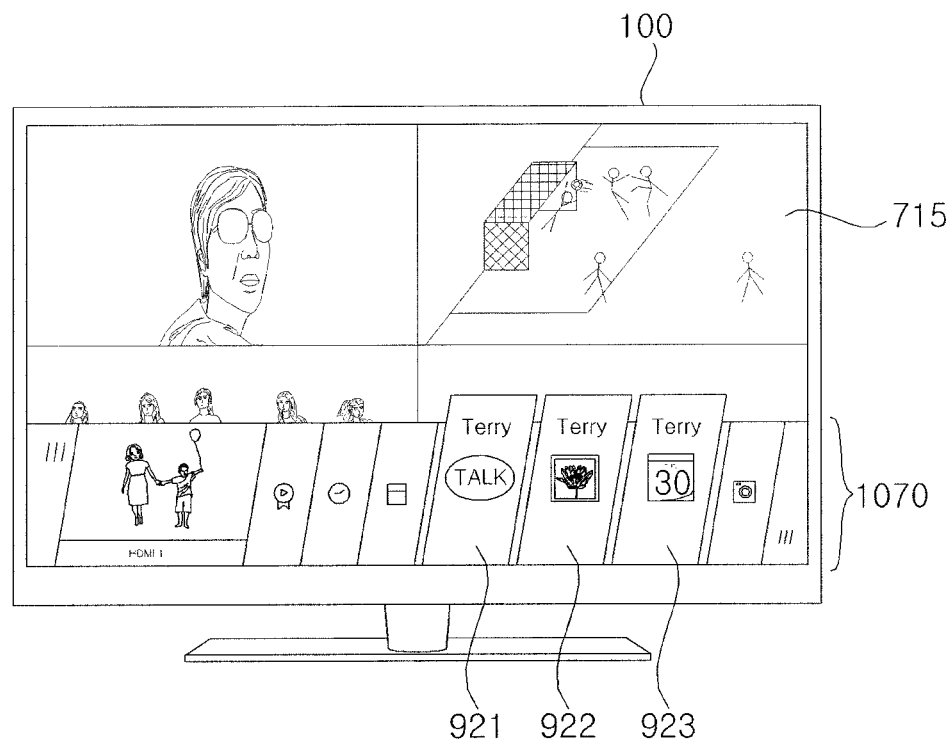
Figure 10B:
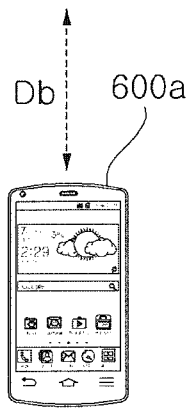

FIG. 10B exemplarily illustrates that a distance between the image display apparatus 100 and the first mobile terminal 600*a* is a short distance Db.

The controller 170 of the image display apparatus 100, if the distance between the image display apparatus 100 and the first mobile terminal 600*a* is a short distance Db and thus the intensity of a wireless signal received from the first mobile terminal 600*a* is the designated intensity or more, may automatically display an application list 1070 including execution icons 921, 922 and 923 corresponding to the first mobile terminal 600*a* based on device information received from the first mobile terminal 600*a*, as exemplarily shown in FIG. 10B. Thereby, a user may simply enter the mirroring mode.

Figure 10C:
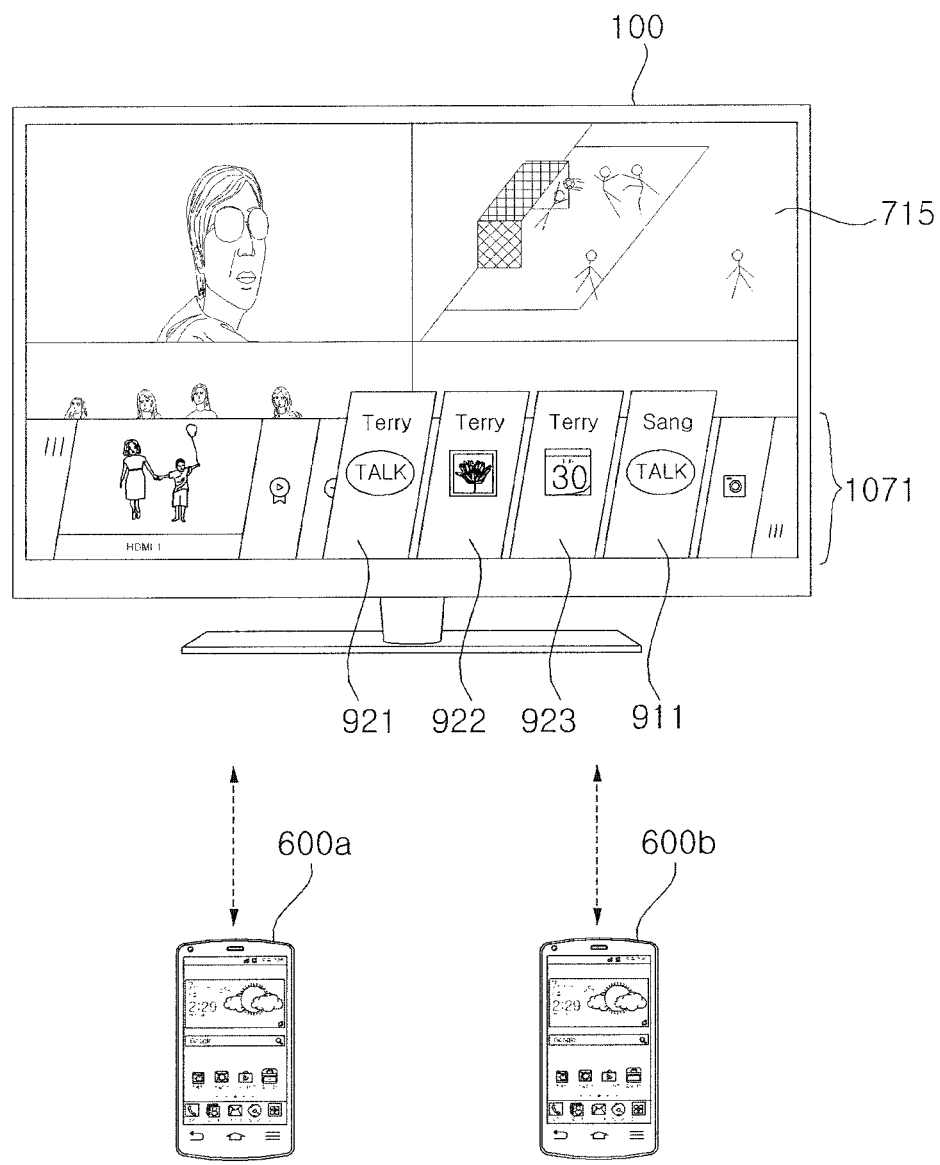

FIG. 10C exemplarily illustrates that the first mobile terminal 600*a* and the second mobile terminal 600*b* are located close to the image display apparatus 100.

If the second mobile terminal 600*b* is further provided in addition to FIG. 10*b* and a distance between the image display apparatus 100 and the second mobile terminal 600*b* is a short distance Db, the controller 170 of the image display apparatus 100 may automatically display an application list 1071 including execution icons 921, 922 and 923 corresponding to the first mobile terminal 600*a* and an execution icon 922 corresponding to the second mobile terminal 600*b* based on device information received from the second mobile terminal 600*b*, as exemplarily shown in FIG. 10O. Thereby, users may simply enter the mirroring mode.

Figure 11:
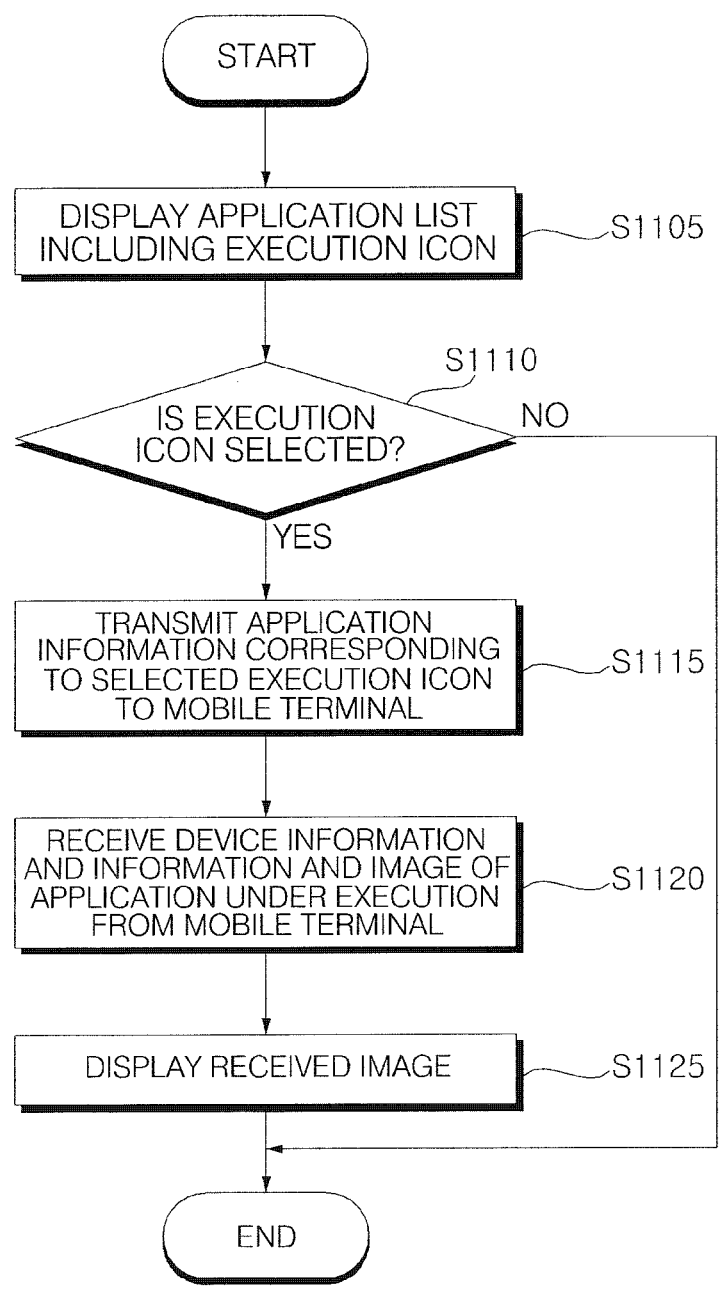
FIG. 11 is a flowchart illustrating a method for operating an image display apparatus in accordance with another embodiment of the present invention.

FIG. 11 is a flowchart illustrating a method for operating an image display apparatus in accordance with another embodiment of the present invention and FIGS. 12A to 13F are reference views to illustrate the method of FIG. 11.

With reference to the drawings, the controller 170 of the image display apparatus 100 displays an application list including an execution icon of an application regarding mirroring, according to application display input (Operation S1105).

Thereafter, in response to selection of the execution icon (Operation S1110), the controller 170 of the image display apparatus 100 transmits application information corresponding to the execution icon to the mobile terminal 600 (Operation S1115).

Thereafter, the external device interface unit 130 of the image display apparatus 100 receives device information, information of an application under execution and an application image from the mobile terminal 600 (Operation S1120).

Thereafter, the controller 170 of the image display apparatus 100 may display the received application image on the display 180 (Operation S1125).

Figure 12A:
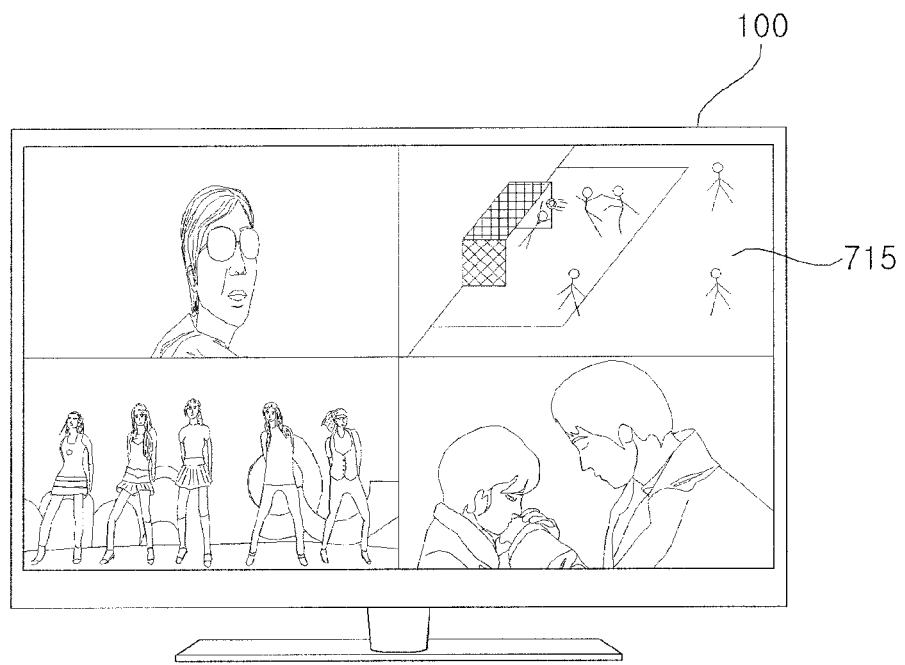
FIGS. 12A to 13F are reference views to illustrate the method of FIG. 11.

FIG. 12A exemplarily illustrates that a designated image 715 is displayed on the image display apparatus 100. The designated image 715 may be a broadcast image.

FIG. 12B exemplarily illustrates that, if a designated key 201 of the remote controller 200 is operated, an application list 1270 is displayed together with the image 715.

The application list 1270 may include execution icons 771, 773 and 774 regarding mirroring.

If a gallery application execution icon 774 is selected by the pointer 205 based on a pointing signal from the remote controller 200, the controller 170 of the image display apparatus 100 may transmit gallery application execution information (Ssa) to the mobile terminal 600 through the external device interface unit 130.

Thereby, the mobile terminal 600 may execute a gallery application.

FIG. 12C exemplarily illustrates that a gallery application image 840a is displayed on the mobile terminal 600 according to execution of the gallery application, a wireless signal (Saib) of the gallery application image 840a is transmitted to the image display apparatus 100, and a mirrored gallery application image 840b is displayed on the image display apparatus 100.

Differently from FIG. 12C, the controller 170 of the image display apparatus 100 may display the gallery application image 840b together with the designated image 715, which is being displayed.

Figure 12D:
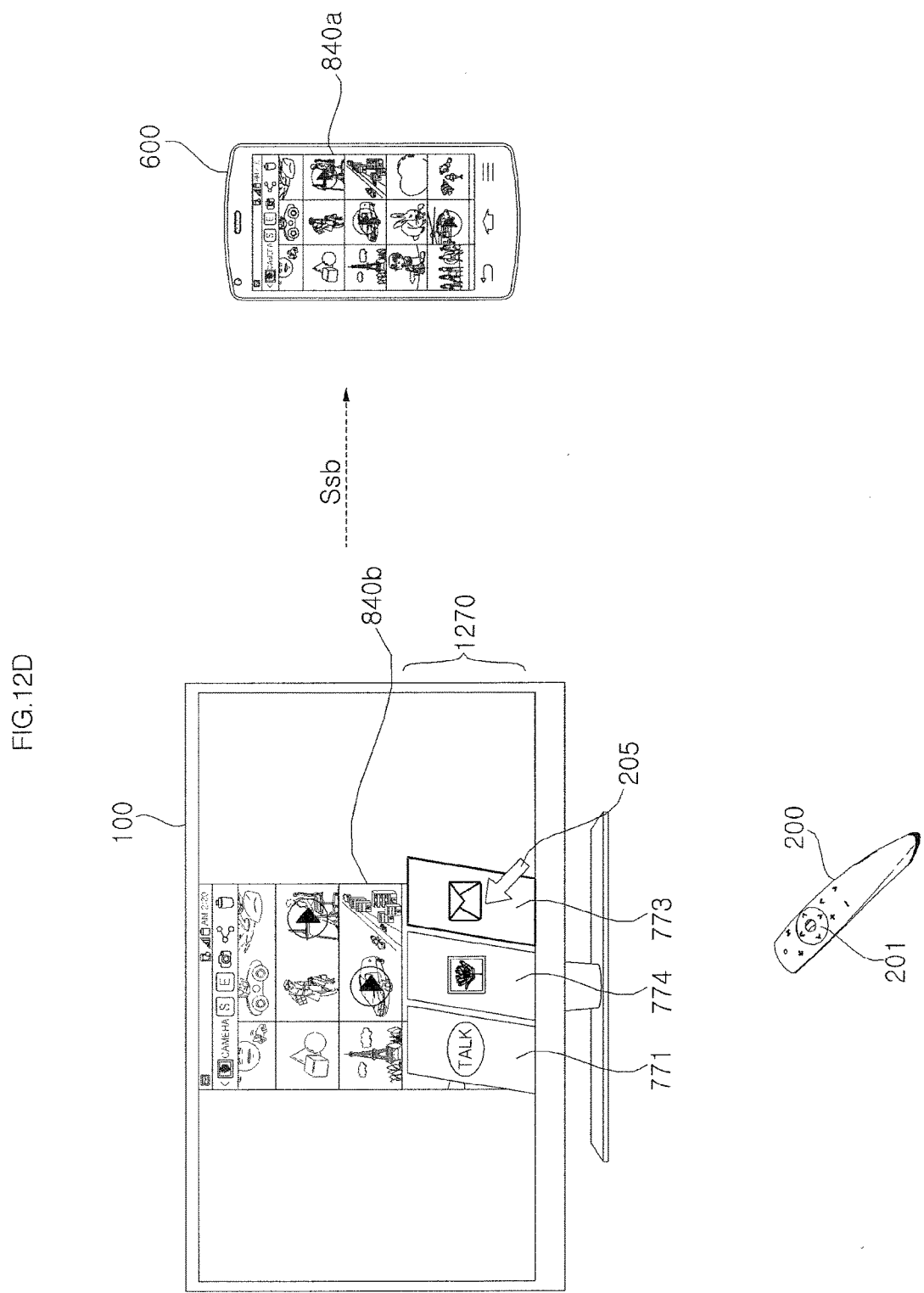

If a designated key 201 of the remote controller 200 is operated, the controller 170 of the image display apparatus 100 may display the application list 1270 including the execution icons 771, 773 and 774 regarding mirroring, as exemplarily shown in FIG. 12D. Particularly, the application list 1270 may be displayed together with the gallery application image 840b, which is being displayed.

If a mail application execution icon 773 is selected by the pointer 205 based on a pointing signal from the remote controller 200, the controller 170 of the image display apparatus 100 may transmit mail application execution information (Ssb) to the mobile terminal 600 through the external device interface unit 130.

Thereby, the mobile terminal 600 may execute a mail application.

FIG. 12E exemplarily illustrates that a mail application image 740a is displayed on the mobile terminal 600 according to execution of the mail application, a wireless signal (Saia) of the mail application image 740a is transmitted to the image display apparatus 100, and a mirrored application image 740b is displayed on the image display apparatus 100.

The external device interface unit 130 may receive device information, information of a first application under execution and an image of the first application under execution from the mobile terminal 600 at a first time, and receive device information, information of a second application under execution and an image of the second application under execution from the mobile terminal 600 at a second time subsequent to the first time.

Further, the controller 170, if a time difference between the first time and the second time is a designated time or less, may display the first application image and the second application image on the display 180 through the screen division method.

Figure 12F:
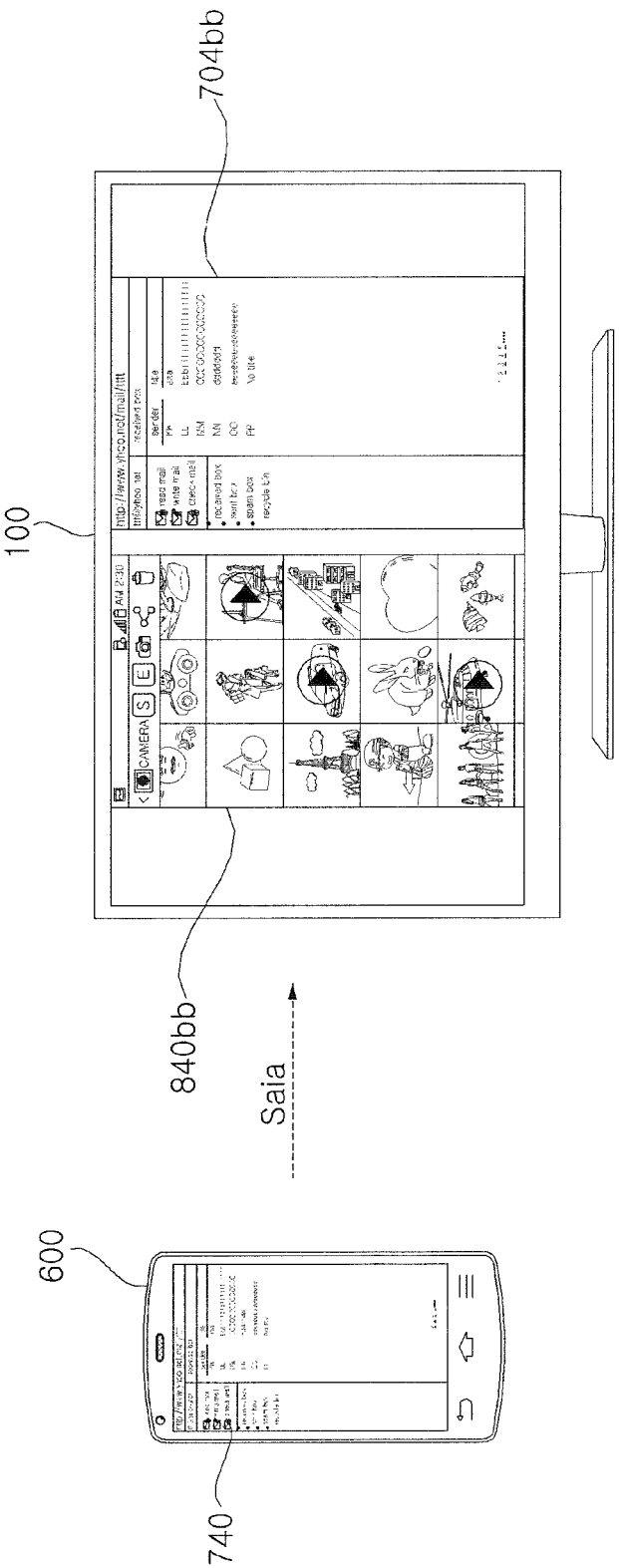

That is, if the second application image of FIG. 12E is received within a designated time or less after reception of the first application image of FIG. 12B, the controller 170 of the image display apparatus 100 may display both a mirrored gallery application image 840bb and a mirrored mail application image 740bb, as exemplarily shown in FIG. 12F. That is, in the mirroring mode, screen division is carried out using a time machine function and, thus, user convenience may be increased.

The controller 170 may be connected to the mobile terminal 600 and set an application selected from a plurality of applications in the mobile terminal 600 as an application, in which mirroring is executable. Thereby, the mobile terminal 600 may control the selected application so as to be included in the folder 705 of FIG. 7B.

The controller 170 of the image display apparatus 100 may generate an execution icon corresponding to the selected and set application. Further, when an application list is displayed, the controller 170 of the image display apparatus 100 may display the application list to which the generated execution icon is added.

Figure 13A:
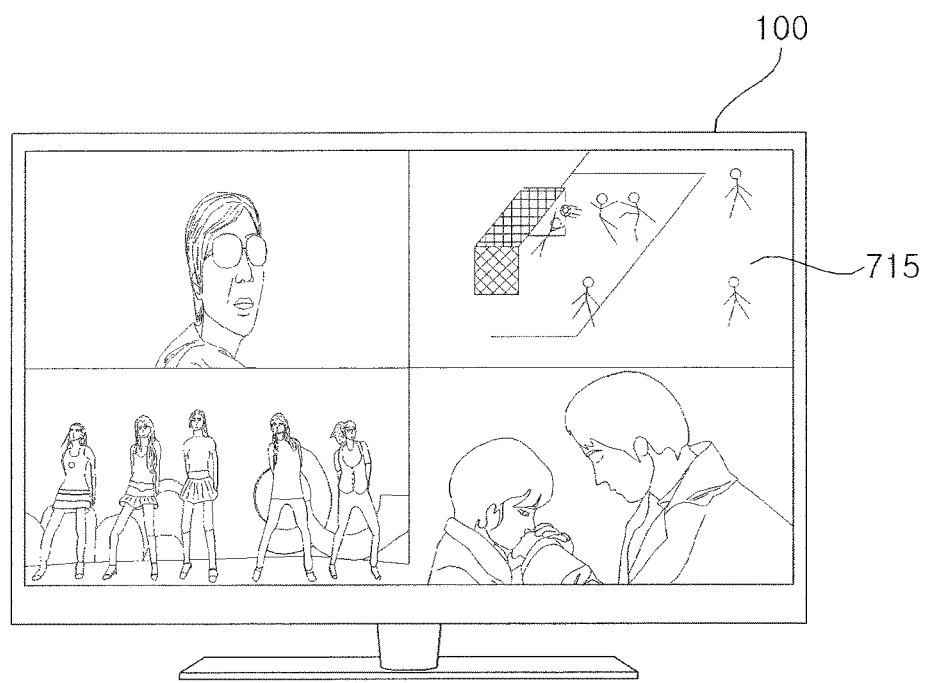
Figure 13A:
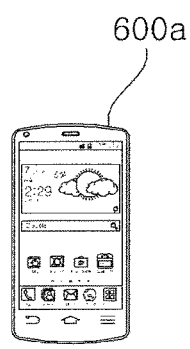

FIG. 13A exemplarily illustrates that a designated image 715 is displayed on the image display apparatus 200. The designated image 715 may be a broadcast image.

FIG. 13B exemplarily illustrates that, if a designated key 201 of the remote controller 200 is operated, an application list 970a is displayed together with the image 715.

The application list 970a may include execution icons 921, 922 and 923 regarding mirroring of a first mobile terminal 600a of a first user (Terry), and an execution icon 911 regarding mirroring of a second mobile terminal 600b of a second user (Sang).

If a gallery application execution icon 922 regarding the first mobile terminal 600a of the first user (Terry) is selected by the pointer 205 based on a pointing signal from the remote controller 200, the controller 170 of the image display apparatus 100 may transmit galley application execution information (Ssc) to the first mobile terminal 600a through the external device interface unit 130.

Thereby, the first mobile terminal 600a may execute a gallery application.

FIG. 13C exemplarily illustrates that a gallery application image 840a is displayed on the first mobile terminal 600a according to execution of the gallery application, a wireless signal (Saib) of the gallery application image 840a is transmitted to the image display apparatus 100, and a mirrored gallery application image 840b is displayed on the image display apparatus 100.

Differently from FIG. 13C, the controller 170 of the image display apparatus 100 may display the gallery application 840b together with the designated image 715, which is being displayed.

If a designated key 201 of the remote controller 200 is operated, the controller 170 of the image display apparatus 100 may display the application list 970a including the execution icons 921, 922 and 923 regarding mirroring of the first mobile terminal 600a of the first user (Terry) and the execution icon 911 regarding mirroring of the second mobile terminal 600b of the second user (Sang). Particularly, the application list 970*a* may be displayed together with the gallery application image 840*b*, which is being displayed.

If a messenger application execution icon 911 regarding the second mobile terminal 600*b* of the second user (Sang) is selected by the pointer 205 based on a pointing signal from the remote controller 200, the controller 170 of the image display apparatus 100 may transmit messenger application execution information (Ssd) to the second mobile terminal 600*b* through the external device interface unit 130.

Thereby, the second mobile terminal 600*b* may execute a messenger application.

Figure 13E:
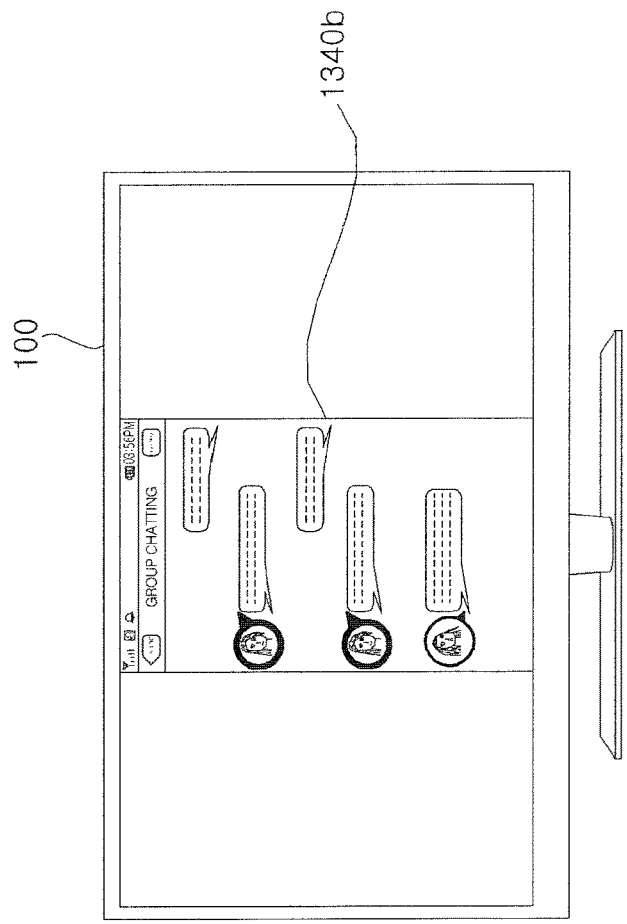
Figure 13E:
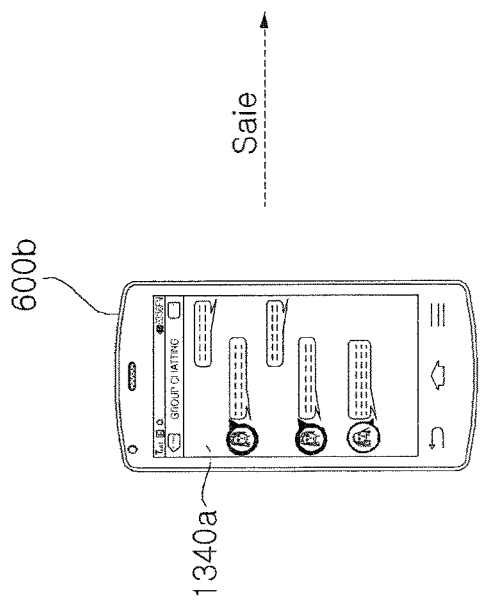

FIG. 13E exemplarily illustrates that a messenger application image 1340*a* is displayed on the second mobile terminal 600*b* according to execution of the messenger application, a wireless signal (Saie) of the messenger application image 1340*a* is transmitted to the image display apparatus 100, and a mirrored messenger application image 1340*b* is displayed on the image display apparatus 100.

Further, the external device interface unit 130 may receive device information, information of a first application under execution and an image of the first application under execution from the mobile terminal 600 at a first time, and receive device information, information of a second application under execution and an image of the second application under execution from the mobile terminal 600 at a second time subsequent to the first time.

The controller 170, if a time difference between the first time and the second time is a designated time or less, may display the first application image and the second application image on the display 180 through the screen division method.

Figure 13F:
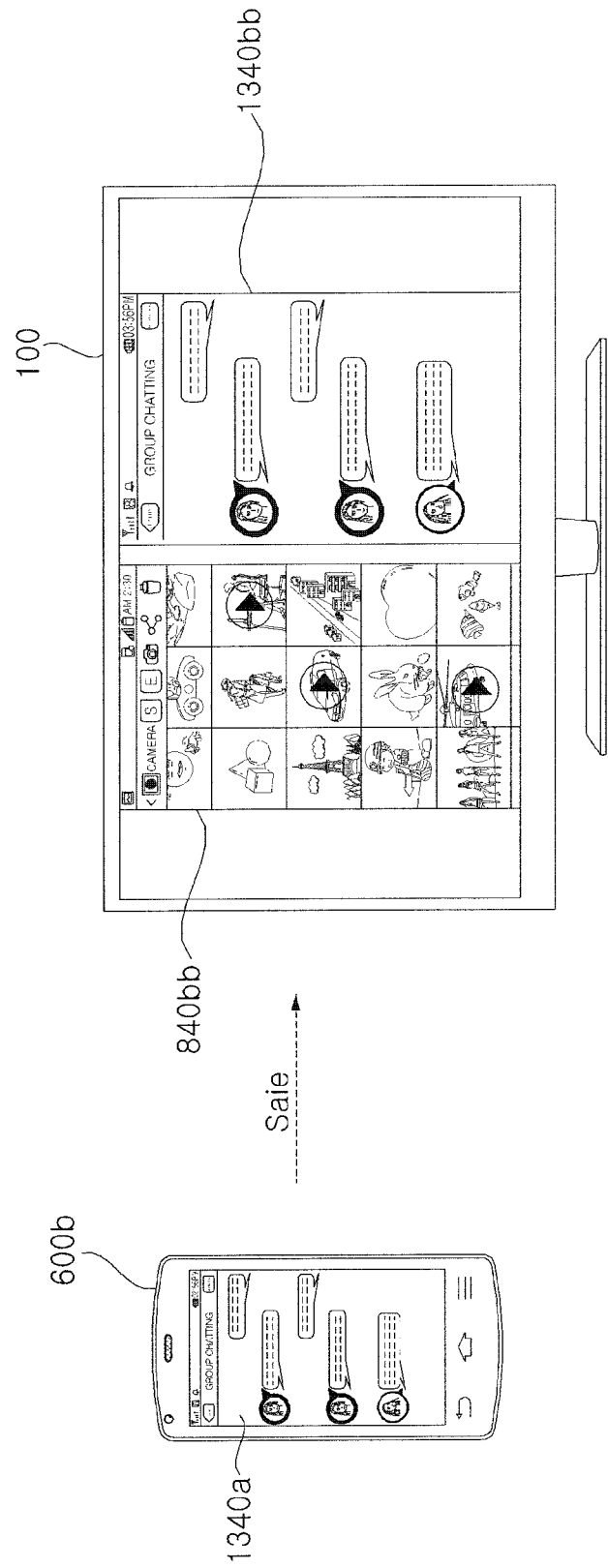

That is, if the second application image of FIG. 13E is received within a designated time or less after reception of the first application image of FIG. 13B, the controller 170 of the image display apparatus 100 may display both a mirrored gallery application image 840*bb* and a mirrored messenger image 1340*bb*, as exemplarily shown in FIG. 13F. That is, in the mirroring mode, screen division is carried out using a time machine function and, thus, user convenience may be increased.

Differently from FIGS. 13A to 13F, the external device interface unit 130 of the image display apparatus 100 may receive device information, information of the applications under execution and images of the applications under execution from a plurality of mobile terminals 600.

Further, the controller 170 of the image display apparatus 100 may display the application images received from the mobile terminals 600 on the display 180 through the screen division method.

That is, if the gallery application is executed in the first mobile terminal 600*a* and the messenger application is executed in the second mobile terminal 600*b*, the controller 170 of the image display apparatus 100 may display both a mirrored gallery application image 840*bb* and a mirrored messenger application image 1340*bb*, as exemplarily shown in FIG. 13F.

An operating method of the image display apparatus in accordance with the present invention may be implemented as code readable by a processor provided in the image display apparatus in a recording medium readable by the processor. The recording medium readable by the processor may be any kind of recording device in which data readable by the processor are stored. As one example, the recording medium readable by the processor may include a ROM, a RAM, a CD-ROM, a magnetic tape, a floppy disk, an optical data storage medium, or a carrier wave, such as data transmission over the Internet. Further, since the recording medium readable by the processor may be distributed to computer systems connected through a network, code readable by the processor may be stored and executed in a distributed manner.

As apparent from the above description, an image display apparatus in accordance with one embodiment of the present invention includes a display, an interface unit to exchange data with a mobile terminal, and a controller to control the display to display an execution icon to execute at least one of applications installed in the mobile terminal and, in response to selection of the execution icon, to display an execution image of at least one application corresponding to the execution icon, and may thus simply perform mirroring between the mobile terminal and the image display apparatus.

Particularly, the controller controls the display to display the execution icon, in response to connection to the mobile terminal wirelessly by a first communication scheme, and may thus simply perform mirroring between the mobile terminal and the image display apparatus.

In a mirroring mode, when a designated application image is firstly received from the mobile terminal, an execution icon of the corresponding application is generated based on information of the application under execution received together with the application image and, thus, an execution icon may be simply generated and displayed during mirroring between the mobile terminal and the image display apparatus.

Particularly, when an application under execution is terminated, an execution icon of the corresponding application is generated and, thus, user convenience may be increased.

Further, when the image display apparatus performs mirroring with a plurality of mobile terminals, execution icons of applications executed by the respective mobile terminals may be generated and displayed and, thus, user convenience may be increased.

Here, an execution icon to be displayed varies according to received user information and mobile terminal information and thus an execution icon suited to a user may be provided. Thereby, user convenience may be increased.

An application image may be displayed together with a broadcast image and, thereby, a user may view both the broadcast image and the image of an application executed by the mobile terminal through a large-scale screen.

If images of applications under execution in a plurality of mobile terminals are received, the application images may be displayed through screen division and thus respective users may view desired images.

An image display apparatus in accordance with another embodiment of the present invention includes a display, an interface unit to exchange data with a mobile terminal, and a controller to display an application list according to application list display input, to, if an execution icon, mirroring with the mobile terminal being executable, is selected from the application list, to transmit application information corresponding to the execution icon to the mobile terminal, and to display an execution image of at least one application received from the mobile terminal, and may thus simply perform mirroring between the mobile terminal and the image display apparatus.

An image display apparatus in accordance with yet another embodiment of the present invention includes a display, an interface unit to exchange data with a mobile terminal, and a controller to receive device information, information of an application under execution and an image of the application under execution from the mobile terminal, to control the display to display the received application image, and, in response to conversion of the application into another application or termination of the application, to generate an execution icon of the application and to display the generated execution icon, and may thus simply perform mirroring between the mobile terminal and the image display apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image display apparatus comprising:
    a display;
    an interface to exchange data with a mobile terminal; and
    a controller to control the display to display an execution icon to execute at least one of applications installed in the mobile terminal and, in response to selection of the execution icon, to display an image of at least one application corresponding to the execution icon,
    wherein the controller:
    controls the display to automatically display a first application list including a first execution icon corresponding to a first mobile terminal, when an intensity of a wireless signal received from the first mobile terminal is a designated intensity or more, and
    in the display state of the first application list, controls the display to automatically display a second application list including the first execution icon and a second execution icon corresponding to a second mobile terminal, when an intensity of a wireless signal received from the second mobile terminal is a designated intensity or more.

2. The image display apparatus according to claim 1, wherein the controller controls the display to display the execution icon, in response to connection to the mobile terminal wirelessly by a first communication scheme.

3. The image display apparatus according to claim 2, wherein the controller, in response to selection of the execution icon, transmits application information corresponding to the execution icon to the mobile terminal so as to execute the application corresponding to the execution icon, receives an image of the application executed by the mobile terminal through the interface by a second communication scheme, and controls the display to display the application image.

4. The image display apparatus according to claim 1, wherein the controller, when a designated application image is firstly received from the mobile terminal, by a mirroring mode, generates an execution icon of a corresponding application based on information of the application under execution received together with the application image.

5. The image display apparatus according to claim 4, wherein the controller controls the display to display the generated execution icon, after termination of the mirroring mode.

6. The image display apparatus according to claim 1, wherein the controller:
    disposes the first execution icon within the first application list; and
    aligns a plurality of execution icons corresponding to a plurality of applications in the order of reception from the mobile terminal or in the order of execution by the mobile terminal.

7. The image display apparatus according to claim 1, wherein the controller controls the display to display an execution icon corresponding to received user information or mobile terminal information, according to the user information or mobile terminal information.

8. The image display apparatus according to claim 1, wherein:
    the interface receives device information, information of applications under execution, and images of the applications under execution from a plurality of mobile terminals; and
    the controller controls the display to display the application images received from the mobile terminals on the display through screen division.

9. The image display apparatus according to claim 1, wherein the interface:
    receives device information, information of a first application under execution and an image of the first application under execution from the mobile terminal at a first time; and
    receives device information, information of a second application under execution and an image of the second application under execution from the mobile terminal at a second time subsequent to the first time,
    wherein the controller, if a time difference between the first time and the second time is a designated time or less, controls the display to display the first application image and the second application image on the display through screen division.

10. The image display apparatus according to claim 1, wherein the controller:
    is wirelessly connected to the mobile terminal and sets an application selected from a plurality of applications in the mobile terminal as an application, in which mirroring is executable; and
    generates an execution icon corresponding to the set application.

11. The image display apparatus according to claim 1, further comprising a broadcast reception unit to receive a broadcast signal,
    wherein the controller controls the display to display a broadcast image based on the broadcast signal together with the application image.

12. The image display apparatus according to claim 1, wherein the controller controls the display to automatically display the execution icon, when the intensity of a wireless signal received from the mobile terminal is a designated intensity or more.

13. The image display apparatus according to claim 1, wherein the controller controls the display to display the first application list according to an application list display input and to display the first execution icon within the first application list.

14. The image display apparatus according to claim 1, wherein the controller controls the display to display the first application list according to an application list display input, to display a user icon for mirroring within the first application list, and, in response to selection of the user icon, to display the execution icon for a corresponding user.

15. An image display apparatus comprising:
    a display;
    an interface to exchange data with a mobile terminal; and
    a controller to display an application list according to an application list display input, to, in response to selection of an execution icon, mirroring with the mobile terminal being executable, from the application list, to transmit application information corresponding to the execution icon to the mobile terminal, and to display an execution image of at least one application received from the mobile terminal, wherein the controller:

controls the display to automatically display a first application list including a first execution icon corresponding to a first mobile terminal, when an intensity of a wireless signal received from the first mobile terminal is a designated intensity or more, and in the display state of the first application list, controls the display to automatically display a second application list including the first execution icon and a second execution icon corresponding to a second mobile terminal, when an intensity of a wireless signal received from the second mobile terminal is a designated intensity or more.

16. An image display apparatus comprising:
a display;
an interface to exchange data with a mobile terminal; and
a controller to receive device information, information of an application under execution and an image of the application under execution from the mobile terminal, to control the display to display the received application image, and, in response to conversion of the application into another application or termination of the application, to generate an execution icon of the application and to display the generated execution icon,
wherein the controller:
controls the display to automatically display a first application list including a first execution icon corresponding to a first mobile terminal, when an intensity of a wireless signal received from the first mobile terminal is a designated intensity or more, and in the display state of the first application list, controls the display to automatically display a second application list including the first execution icon and a second execution icon corresponding to a second mobile terminal, when an intensity of a wireless signal received from the second mobile terminal is a designated intensity or more.

17. The image display apparatus according to claim 16, wherein the controller, in response to selection of the execution icon, controls the display to display an execution image of at least one application corresponding to the execution icon.

18. The image display apparatus according to claim 16, wherein the controller controls the display to display execution icons corresponding to user information or mobile terminal information according to users.

19. The image display apparatus according to claim 16, wherein the controller, if images of applications under execution are received from a plurality of mobile terminals, controls the display to display the application images received from the mobile terminals on the display through screen division.

* * * * *